(12) United States Patent
Sasa et al.

(10) Patent No.: US 8,147,942 B2
(45) Date of Patent: Apr. 3, 2012

(54) WORM OPTICAL RECORDING MEDIUM

(75) Inventors: Noboru Sasa, Kanagawa (JP);
 Masayuki Fujiwara, Miyagi (JP);
 Yoshitaka Hayashi, Kanagawa (JP);
 Toshishige Fujii, Kanagawa (JP);
 Toshihide Sasaki, Kanagawa (JP);
 Hiroyoshi Sekiguchi, Kanagawa (JP);
 Hideyuki Yasufuku, Kanagawa (JP);
 Kawori Tanaka, Tokyo (JP); Kengo Makita, Kanagawa (JP); Noriyuki Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 670 days.

(21) Appl. No.: 12/303,231

(22) PCT Filed: Apr. 1, 2008

(86) PCT No.: PCT/JP2008/056838
§ 371 (c)(1),
(2), (4) Date: Dec. 2, 2008

(87) PCT Pub. No.: WO2008/123620
 PCT Pub. Date: Oct. 16, 2008

(65) Prior Publication Data
 US 2009/0197117 A1  Aug. 6, 2009

(30) Foreign Application Priority Data

Apr. 2, 2007  (JP) ................................ 2007-096867
May 22, 2007  (JP) ................................ 2007-135903

(51) Int. Cl.
 *B32B 3/02* (2006.01)
(52) U.S. Cl. .................. 428/64.1; 428/64.4; 430/270.12

(58) Field of Classification Search ................. 428/64.4; 430/270.12
 See application file for complete search history.

(56) References Cited

U.S. PATENT DOCUMENTS

| | | | |
|---|---|---|---|
| 3,971,874 A | 7/1976 | Ohta et al. | |
| 6,057,020 A | 5/2000 | Ueno et al. | |
| 6,197,477 B1 | 3/2001 | Satoh et al. | |
| 6,558,768 B2 | 5/2003 | Noguchi et al. | |
| 6,628,595 B1 | 9/2003 | Sasa et al. | |
| 6,741,547 B2 | 5/2004 | Tomura et al. | |
| 6,762,008 B2 | 7/2004 | Satoh et al. | |
| 6,884,487 B2 | 4/2005 | Ito et al. | |
| 6,933,032 B2 | 8/2005 | Sasa et al. | |
| 7,061,847 B2 | 6/2006 | Sasa et al. | |
| 7,413,788 B2 | 8/2008 | Sasa et al. | |
| 2002/0110063 A1 | 8/2002 | Yamada et al. | |
| 2004/0265532 A1* | 12/2004 | Sasa et al. | 428/64.4 |
| 2005/0058055 A1 | 3/2005 | Ito et al. | |
| 2006/0003136 A1 | 1/2006 | Sasa et al. | |
| 2006/0088684 A1 | 4/2006 | Abe et al. | |
| 2006/0188686 A1 | 8/2006 | Ito et al. | |
| 2006/0222810 A1 | 10/2006 | Hayashi et al. | |

(Continued)

FOREIGN PATENT DOCUMENTS

JP  50-46317  4/1975

(Continued)

*Primary Examiner* — Elizabeth Mulvaney
(74) *Attorney, Agent, or Firm* — Dickstein Shapiro LLP

(57) ABSTRACT

A write-once-read-many optical recording medium is disclosed that includes a support substrate; a recording layer on the support substrate, the recording layer containing an oxide of one of a metal and a metalloid as a principal component; and a layer adjacent to the recording layer. The recording layer includes a region where a constituent element of the adjacent layer is dispersed. Recording and reproduction are performable with laser light of a blue wavelength region.

17 Claims, 13 Drawing Sheets

U.S. PATENT DOCUMENTS

| | | |
|---|---|---|
| 2006/0246270 A1 | 11/2006 | Takada et al. |
| 2007/0037095 A1 | 2/2007 | Sasa |
| 2007/0081445 A1 | 4/2007 | Hibino et al. |
| 2007/0237064 A1 | 10/2007 | Fujii et al. |
| 2008/0062841 A1 | 3/2008 | Sasa et al. |

FOREIGN PATENT DOCUMENTS

| | | |
|---|---|---|
| JP | 55-28530 | 2/1980 |
| JP | 59-185048 | 10/1984 |
| JP | 07-25209 | 3/1995 |
| JP | 2656296 | 5/1997 |
| JP | 09-286174 | 11/1997 |
| JP | 2002-133712 | 5/2002 |
| JP | 2003-237242 | 8/2003 |
| JP | 2004-79020 | 3/2004 |
| JP | 2005-108396 | 4/2005 |
| JP | 2005-161831 | 6/2005 |
| JP | 2006-79749 | 3/2006 |
| JP | 2006-116948 | 5/2006 |
| JP | 2006-192885 | 7/2006 |
| JP | 2006-248177 | 9/2006 |
| JP | 2007-261247 | 10/2007 |
| JP | 2008-55723 | 3/2008 |

* cited by examiner

LASER LIGHT

LASER LIGHT

LASER LIGHT

↑ LASER LIGHT

WORM OPTICAL RECORDING MEDIUM

TECHNICAL FIELD

The present invention relates generally to WORM (Write-Once-Read-Many) optical recording media, and more particularly to a WORM optical recording medium that allows high density recording with laser light of the blue wavelength region (350 nm to 500 nm) and has good recording sensitivity.

BACKGROUND ART

With respect to WORM optical recording media that allow recording and reproduction with laser light of a blue wavelength-region (350 nm to 500 nm), the development of blue lasers capable of ultra high density recording has rapidly progressed, and corresponding WORM optical recording media have been developed.

In the conventional WORM optical recording medium, recording pits are formed by emitting laser light onto a recording layer formed of an organic material and thereby causing a change in the refractive index mainly due to the decomposition and modification of the organic material, so that the optical constants and decomposition behavior of the organic material used in the recording layer are important factors in forming satisfactory recording pits.

Accordingly, materials having optical properties and decomposition behavior appropriate for blue wavelength lasers are selected for the recording layers of WORM optical recording media compatible with blue wavelength lasers.

That is, with respect to the conventional WORM optical recording medium having a high-to-low (recording) polarity, recording and reproduction wavelengths are selected so as to be positioned at the longer-wavelength-side edge of a large absorption band in order to increase reflectance in the unrecorded state and to have a large change caused in refractive index by decomposition of the organic material due to exposure to laser light (so as to have a high degree of modulation).

This is because the longer-wavelength-side edge of a large absorption band of an organic material is a wavelength region where absorption coefficients are appropriate and the refractive index is high.

However, there has been found no organic material whose optical properties with respect to blue wavelength laser light have values equivalent to those of a recording material compatible with the conventional red wavelength laser light. This is because the molecular skeleton should be reduced in size or the conjugate system should be shortened in order for an organic material to have an absorption band in the vicinity of blue wavelengths, which, however, results in a decrease in the absorption coefficient, that is, a decrease in the refractive index.

That is, there are many organic materials having an absorption band in the vicinity of blue wavelengths and it is possible to control their absorption coefficients. However, since they do not have high refractive indices, they fail to yield a high degree of modulation.

Further, organic dyes, which are less stable than inorganic materials, have problems in keeping quality and light resistance. Therefore, it has been studied to use an inorganic material for the recording layer of the WORM optical recording medium compatible with blue wavelength laser light.

Examples of the inorganic material recording layer of the WORM optical recording medium compatible with blue wavelength laser light are as follows.

Japanese Laid-Open Patent Application No. 9-286174 (Patent Document 1) proposes a recording layer using the same phase change material as used for a rewritable optical recording medium. However, since the WORM optical recording medium is required to retain information for a long period of time, phase change materials are not sufficient in terms of the storage (retention) characteristic.

Japanese Laid-Open Patent Application No. 2004-79020 (Patent Document 2) proposes stacking inorganic materials in multiple layers and performing recording using their reaction. However, recording using the reaction of multiple layers is not suitable for long-term retention because the reaction progresses with time.

On the other hand, Japanese Laid-Open Patent Application No. 2002-133712 (Patent Document 3) and Japanese Laid-Open Patent Application No. 2003-237242 (Patent Document 4) propose techniques of using metal or metalloid for a recording layer. The former shows a recording layer containing Te, O, and another element, and the latter shows a recording layer containing an imperfect oxide of a transition metal. Further, the latter states that the imperfect oxide of the transition metal may contain an element other than transition metals, but provides only Al as a specific example of such an element. Further, there is no clear definition of transition metal because some definitions include Zn, Y, etc., while others do not, and only W and Mo are described in detail.

No description is given in detail of one object of the present invention, that is, to increase sensitivity, in either the former or the latter document.

A WORM optical recording medium using an oxide for its recording layer is suitable for high density recording because the recording layer is low in thermal conductivity so as to control the thermal interference between recording marks.

In the case of using an oxide for the recording layer, it has been proposed to reduce the degree of oxidation of the oxide (increase the amount of oxygen deficiency) as a method of further improving recording characteristics.

Examples of techniques using a material having less oxygen than its stoichiometric composition in a red or infrared wavelength region include using TeOx ($0 \leq x \leq 2$) (Japanese Laid-Open Patent Application No. S50-46317 [Patent Document 5]), using a material containing at least one selected from the group of TeOx, GeOx, SnOx, BiOx, SbOx, and TlOx and at least one of S and Se (Japanese Patent No. 1444471 [Patent Document 6]), using a lower oxide of Ge (GeOx) containing Te and Sb or a lower oxide of Sb (SbOx) containing Te and Ge (Japanese Patent No. 1849839 [Patent Document 7]), using a low oxide of Ni expressed by NiOx (Japanese Patent No. 2656296 [Patent Document 8]), and an information recording method that forms an image by exposing a low oxide of In to laser light (Japanese Laid-Open Patent Application No. S51-21780 [Patent Document 9]).

Further, Japanese Examined Patent Application Publication No. 7-25209 (Patent Document 10) shows adding an element selected from Sn, In, Bi, Zn, Al, Cu, Ge, and Sb to TeOx with respect to a low oxide in a red wavelength region. In the text of Patent Document 10, BiOx is described as effective when Te, Sb, or Ge is added thereto. However, this technique utilizes a so-called "blackening phenomenon," where light transmittance changes due to exposure to light and relates to a reversible film that allows a recorded part by blackening to return to its original transmittance through exposure to light.

However, Patent Documents 5 through 10 described above are related to recording media subjected to recording and reproduction in a red or infrared wavelength region, and do not describe techniques supporting blue wavelength laser light.

Therefore, Japanese Laid-Open Patent Application No. 2005-108396 (Patent Document 11) and Japanese Laid-Open Patent Application No. 2005-161831 (Patent Document 12) propose WORM optical recording media that allow high density recording even with blue wavelength laser light, in which a recording layer contains a metal or metalloid oxide, in particular, a bismuth oxide, as a principal component.

These WORM optical recording media, in which the thermal conductivity of the recording layer is low so as to suppress the thermal interference between recording marks, are suitable for high density recording.

In the WORM optical recording medium having a recording layer containing a metal or metalloid oxide as a principal component, the following changes form a principal recording principle, and phase separation due to nucleation and growth is considered to be the basis of recording.

A metal or metalloid oxide is decomposed by recording light or heat due to its emission, so that a metal or metalloid simple substance is generated.

Microcrystallization of the metal or metalloid simple substance occurs.

Microcrystallization of the metal or metalloid oxide occurs.

Phase separation of the metal or metalloid simple substance and the metal or metalloid oxide occurs.

If multiple metal or metalloid oxides are mixed, phase separation of different oxides occurs.

With respect to recording materials used in WORM optical recording media compatible with blue wavelength laser light, it is easily imaginable that a further increase in recording speed is to be desired, so that it is desirable to further increase recording sensitivity. However, there is a problem in that a metal or metalloid oxide alone is slightly lower in absorption coefficient with respect to recording and reproduction light than, for example, the phase change material as shown in Patent Document 1 or the metal materials as shown in Patent Document 2, so as to have insufficient recording sensitivity compared with higher recording sensitivity to be required in the future.

Some of the inventors of the present invention have found that as a method of further increasing the sensitivity of a recording layer containing a metal or metalloid oxide as a principal component without degrading recording and reproduction characteristics, it is effective to reduce the degree of oxidation of the oxide (increase the amount of oxygen deficiency) (Japanese Laid-Open Patent Application No. 2006-248177 [Patent Document 13]). According to Patent Document 13, a bismuth oxide is caused to contain another oxide, and the oxygen content of the resultant oxide is less than that according to the stoichiometric composition. In this case also, the recording principle is the same as described above. However, the existence of metallic bismuth makes it possible to increase the absorption coefficient of the recording layer with respect to recording light. Accordingly, recording sensitivity is improved. Further, if the oxygen content of the bismuth oxide is less than that according to the stoichiometric composition, crystals of the metallic bismuth are more likely to be deposited so as to yield a higher degree of modulation in the blue wavelength region as well.

Further, it is effective to cause the bismuth oxide to contain another oxide in order to prevent the metal bismuth from aggregating even when the abundance ratio of the metallic bismuth is increased. According to this method, a decrease in the matrix of the bismuth oxide due to the increase in the abundance ratio of the metallic bismuth is compensated for by causing the bismuth oxide to contain another oxide so as to prevent a decrease in the ratio of the matrix to the metallic bismuth, thereby making it possible to prevent aggregation of the metallic bismuth.

By this method, it is possible to cause the oxygen content of the bismuth oxide to be even less than that according to stoichiometric composition compared with the case of forming the recording layer only of the bismuth oxide, which is effective in improving sensitivity.

Further, controlling an increase in the amount of crystalline deposition by adding another oxide to the bismuth oxide results in good formation of small marks, thus making it easy to increase density. Further, the addition of another oxide stabilizes recording marks, thus improving retention (storage) stability.

The recording principle of a WORM optical recording medium having a recording layer of a bismuth oxide containing another oxide is considered to be based on the following changes.

The bismuth oxide is decomposed by recording light or heat due to its emission, so that metallic bismuth is generated.

Microcrystallization of the metallic bismuth occurs.

Microcrystallization of the bismuth oxide occurs.

Microcrystallization of the other oxide occurs.

Phase separation of the metallic bismuth and the bismuth oxide and/or the other oxide occurs.

Phase separation of the bismuth oxide and the other oxide occurs.

Examples of the above-described method of reducing the degree of oxidation of metal or metalloid include controlling the amount of oxygen or controlling the composition of a sputtering target (adding to the sputtering target a metal or metalloid forming a metal or metalloid oxide that is the principal component of the sputtering target) at the time of forming a film of the metal or metalloid oxide by sputtering.

However, this method has the following problems.

An increase in the amount of oxygen deficiency of the metal or metalloid oxide in the recording layer or the sputtering target degrades recording and reproduction characteristics or recording sensitivity.

An increase in the amount of oxygen deficiency of the metal or metalloid oxide in the sputtering target makes it difficult to prepare the sputtering target or results in poor durability of the sputtering target.

It is difficult to control the uniformity of the degree of oxidation in the directions of film thickness.

In the case of excessive reduction in the degree of oxidation of the metal or metalloid oxide in the recording layer, if the metal or metalloid has a low melting point, the metal or metalloid is melted by recording, so that phase separation, which is the primary recording principle, is less likely to occur.

Further, the thermal conductivity of the metal or metalloid simple substance is extremely higher than that of the metal or metalloid oxide. Accordingly, if the metal or metalloid simple substance content is higher than or equal to a certain value, this results in degradation of recording sensitivity or degradation of recording and reproduction characteristics such as a reduced degree of modulation.

Further, in the metal or metalloid oxide, as the oxygen content becomes less than that according to the stoichiometric composition (that is, as the abundance ratio of the metal or metalloid increases), larger crystals are deposited so as to make it difficult to record small marks.

Further, in the case where the recording layer is formed only of one type of metal or metalloid oxide, causing the oxygen content in the metal or metalloid oxide to be less than that according to the stoichiometric composition reduces the metal or metalloid oxide that is a matrix. As a result, the metal or metalloid is more likely to aggregate, so as to degrade the uniformity of the degree of oxidation in the directions of film thickness.

Accordingly, in the case of increasing the metal or metalloid content in the metal or metalloid oxide by causing the oxygen content to be less (lower) than that according to the stoichiometric composition, it is desirable to disperse the metal or metalloid in the metal or metalloid oxide using the metal or metalloid oxide as a matrix or to evenly mix the metal or metalloid and the metal or metalloid oxide.

If the metal or metalloid exists non-uniformly with a local concentration, the melting mode becomes a principal recording principle in the location of concentration, which is not preferable. Further, in the location, melting may also be caused by exposure to reproduction light so as to significantly reduce reproduction stability, which is not preferable, either.

That is, it is effective to reduce the degree of oxidation of the metal or metalloid oxide, which is the basis of the recording principle, but excessive reduction in the degree of oxidation causes the loss of a substance that is the basis of the recording principle and also activates a recording principle that hinders the principal recording principle, which may result in degradation of recording and reproduction characteristics or recording sensitivity.

By the way, for example, Japanese Laid-Open Patent Application No. 2006-192885 (Patent Document 14) shows a layer structure where a recording layer containing a metal or metalloid oxide as a principal component and an adjacent layer containing a mixture of a sulfide and an oxide as a principal component are stacked.

Patent Document 14 shows a WORM optical recording medium having a substrate (undercoat layer), a recording layer containing bismuth and/or a bismuth oxide as a principal component, an overcoat layer, and a reflective layer successively stacked from the laser light emission side, wherein the WORM optical recording medium has a reflectance of 35% or less when laser light is emitted onto a flat part of the substrate. In the above-described WORM optical recording medium, the recording layer may have a film thickness of 3 to 20 nm, and the overcoat layer may have a film thickness of 5 to 60 nm or 70 to 150 nm.

As described above, there have been proposed recording layers containing a metal or metalloid oxide as a principal component and configurations where a recording layer containing a metal or metalloid oxide as a principal component and a layer containing at least one compound selected from oxides, nitrides, carbides, fluorides, and sulfides as a principal component are adjacently stacked.

However, there is an increasing demand for higher speed and higher sensitivity.

DISCLOSURE OF THE INVENTION

Embodiments of the present invention may solve or reduce one or more of the above-described problems.

According to one aspect of the present invention, there is provided a WORM optical recording medium in which one or more of the above-described problems may be solved or reduced.

According to one aspect of the present invention, a region where a constituent element of a specific adjacent layer is diffused (a specific adjacent layer element diffusion region) is formed in a recording layer containing a metal or metalloid oxide as a principal component in order to improve recording and reproduction characteristics represented by jitter, PRSNR (Partial Response Signal-to-Noise Ratio), error rate, a degree of modulation, reproduction stability, retention (storage) reliability, etc.

According to one embodiment of the present invention, there is provided a WORM optical recording medium having a recording layer containing a metal or metalloid as a principal component, the WORM optical recording medium showing good recording and reproduction characteristics with laser light of a blue wavelength region (350 nm to 500 nm), in particular, of 405 nm or in the vicinity of 405 nm, enabling high density recording, and having higher recording sensitivity than conventionally.

According to one embodiment of the present invention, there is provided a write-once-read-many optical recording medium including a support substrate; and a recording layer and a layer adjacent to the recording layer on the support substrate, the recording layer containing an oxide of one of a metal and a metalloid as a principal component, wherein the recording layer includes a region where a constituent element of the adjacent layer is dispersed, and recording and reproduction are performable with laser light of a blue wavelength region.

According to one embodiment of the present invention, there is provided a write-once-read-many optical recording medium including a support substrate; and a recording layer and a layer adjacent to the recording layer on the support substrate, the recording layer containing an oxide of one of a metal and a metalloid and a simple substance of an element of the oxide as a principal component, the element of the oxide being bonded to oxygen, wherein the recording layer includes a region where a constituent element of the adjacent layer is dispersed, and recording and reproduction are performable with laser light of a blue wavelength region.

According to one embodiment of the present invention, there is provided a write-once-read-many optical recording medium including a support substrate; and a recording layer and a layer adjacent to the recording layer on the support substrate, the recording layer containing an oxide of one of a metal and a metalloid and a simple substance of at least one element M as a principal component, wherein the recording layer includes a region where a constituent element of the adjacent layer is dispersed, recording and reproduction are performable with laser light of a blue wavelength region, and the at least one element M reinforces a light absorbing function with respect to the laser light.

According to one embodiment of the present invention, there is provided a write-once-read-many optical recording medium including a support substrate; and a recording layer and a layer adjacent to the recording layer on the support substrate, the recording layer containing an oxide of one of a metal and a metalloid, a simple substance of at least one element M, and an oxide of the at least one element M as a principal component, wherein the recording layer includes a region where a constituent element of the adjacent layer is dispersed, recording and reproduction are performable with laser light of a blue wavelength region, and the at least one element M reinforces a light absorbing function with respect to the laser light.

According to one embodiment of the present invention, there is provided a write-once-read-many optical recording medium including a support substrate; and a recording layer and a layer adjacent to the recording layer on the support substrate, the recording layer containing an oxide of one of a metal and a metalloid, a simple substance of an element of the oxide which element is bonded to oxygen, a simple substance of at least one element M, and an oxide of the at least one element M as a principal component, wherein the recording layer includes a region where a constituent element of the adjacent layer is dispersed, recording and reproduction are performable with laser light of a blue wavelength region, and the at least one element M reinforces a light absorbing function with respect to the laser light.

According to one embodiment of the present invention, there is provided a write-once-read-many optical recording medium including a support substrate; and a recording layer on the support substrate, wherein recording and reproduction are performable with laser light of a blue wavelength region, the recording layer includes an M element dispersion region formed of at least one element M reinforcing a light absorbing function with respect to the laser light, the at least one element M being buried in the recording layer after formation of the recording layer, and the recording layer is one of (a) a recording layer containing an oxide of one of a metal and a metalloid as a principal component; (b) a recording layer containing an oxide of one of a metal and a metalloid and a simple substance of an element of the oxide which element is bonded to oxygen as a principal component; (c) a recording layer containing an oxide of one of a metal and a metalloid and the simple substance of the at least one element M as a principal component; (d) a recording layer containing an oxide of one of a metal and a metalloid, the simple substance of the at least one element M, and an oxide of the at least one element M as a principal component; and (e) a recording layer containing an oxide of one of a metal and a metalloid, a simple substance of an element of the oxide which element is bonded to oxygen, the simple substance of the at least one element M, and an oxide of the at least one element M as a principal component.

According to one or more embodiments of the present invention, it is possible to provide a WORM optical recording medium having a recording layer containing a metal or metalloid as a principal component, the WORM optical recording medium showing good recording and reproduction characteristics with laser light of a blue wavelength region (350 nm to 500 nm), in particular, of 405 nm or in the vicinity of 405 nm, enabling high density recording, and having higher recording sensitivity than conventionally.

Embodiments also include a write-once-read-many optical recording medium, comprising a support substrate and a recording layer and a layer adjacent to the recording layer on the support substrate, the recording layer containing an oxide of one of a metal and a metalloid and a simple substance of an element of the oxide as a principal component, the element of the oxide being bonded to oxygen, wherein the recording layer includes a region where a constituent element of the adjacent layer is dispersed, and recording and reproduction are performable with laser light of a blue wavelength region.

Embodiments also include a write-once-read-many optical recording medium, further comprising an additional layer adjacent to the recording layer, wherein positions at which a number of atoms of the one of the metal and the metalloid of the oxide is a half of a maximum of the number of atoms in the recording layer in an analysis of a composition of the write-once-read-many optical recording medium in a direction of a film thickness thereof are defined as interfaces between the recording layer and the adjacent layer and the additional adjacent layer, and a ratio of the element of the adjacent layer at a center of the recording layer is more than or equal to 5 at % of elements of the recording layer, the center of the recording layer being determined by the interfaces.

Embodiments also include a write-once-read-many optical recording medium, wherein the recording and the reproduction are performed from a side of the support substrate, and the adjacent layer is provided on a side of the recording layer opposite to the side of the support substrate.

Embodiments also include a write-once-read-many optical recording medium, wherein the recording and the reproduction are performed from a side opposite to the support substrate, and the adjacent layer is provided on a side of the recording layer opposite to the support substrate.

Embodiments also include a write-once-read-many optical recording medium, wherein the adjacent layer contains one of an oxide, a nitride, a carbide, a fluoride, and a sulfide, and the constituent element of the adjacent layer dispersed in the region in the recording layer is bonded to one of oxygen, nitrogen, carbon, fluorine, and sulfur in the one of the oxide, the nitride, the carbide, the fluoride, and the sulfide.

Embodiments also include a write-once-read-many optical recording medium, wherein the adjacent layer contains ZnS as a principal component, and the constituent element of the adjacent layer dispersed in the region in the recording layer is Zn.

Embodiments also include a write-once-read-many optical recording medium, further comprising a protective layer, wherein the recording layer, the adjacent layer, and the protective layer are successively stacked in order, and the adjacent layer contains a simple substance of at least one element M as a principal component, the at least one element M reinforcing a light absorbing function with respect to the laser light.

Embodiments also include a write-once-read-many optical recording medium, wherein the one of the metal and the metalloid is bismuth.

Embodiments also include a write-once-read-many optical recording medium, wherein a value of an imaginary part of a complex index of refraction of the recording layer is more than or equal to 0.30 and a value of a real part of the complex index of refraction of the recording layer is more than or equal to 2.20 when the recording layer is exposed to the laser light.

Embodiments also include a write-once-read-many optical recording medium, comprising a support substrate; and a recording layer and a layer adjacent to the recording layer on the support substrate, the recording layer containing an oxide of one of a metal and a metalloid, a simple substance of at least one element M, and an oxide of the at least one element M as a principal component, wherein the recording layer includes a region where a constituent element of the adjacent layer is dispersed, recording and reproduction are performable with laser light of a blue wavelength region, and the at least one element M reinforces a light absorbing function with respect to the laser light.

Embodiments also include a write-once-read-many optical recording medium, further comprising an additional layer adjacent to the recording layer, wherein positions at which a number of atoms of the one of the metal and the metalloid of the oxide is a half of a maximum of the number of atoms in the recording layer in an analysis of a composition of the write-once-read-many optical recording medium in a direction of a film thickness thereof are defined as interfaces between the recording layer and the adjacent layer and the additional adjacent layer, and a ratio of the element of the adjacent layer at a center of the recording layer is more than or equal to 5 at % of elements of the recording layer, the center of the recording layer being determined by the interfaces.

Embodiments also include a write-once-read-many optical recording medium, wherein the recording and the reproduction are performed from a side of the support substrate, and the adjacent layer is provided on a side of the recording layer opposite to the side of the support substrate.

Embodiments also include a write-once-read-many optical recording medium, wherein the recording and the reproduction are performed from a side opposite to the support substrate, and the adjacent layer is provided on a side of the recording layer opposite to the support substrate.

Embodiments also include a write-once-read-many optical recording medium, wherein the adjacent layer contains one of an oxide, a nitride, a carbide, a fluoride, and a sulfide, and the constituent element of the adjacent layer dispersed in the region in the recording layer is bonded to one of oxygen, nitrogen, carbon, fluorine, and sulfur in the one of the oxide, the nitride, the carbide, the fluoride, and the sulfide.

Embodiments also include a write-once-read-many optical recording medium, wherein the adjacent layer contains ZnS as a principal component, and the constituent element of the adjacent layer dispersed in the region in the recording layer is Zn.

Embodiments also include a write-once-read-many optical recording medium, further comprising a protective layer, wherein the recording layer, the adjacent layer, and the protective layer are successively stacked in order.

Embodiments also include a write-once-read-many optical recording medium, wherein the one of the metal and the metalloid is bismuth.

Embodiments also include a write-once-read-many optical recording medium, wherein a value of an imaginary part of a complex index of refraction of the recording layer is more than or equal to 0.30 and a value of a real part of the complex index of refraction of the recording layer is more than or equal to 2.20 when the recording layer is exposed to the laser light.

Embodiments also include a write-once-read-many optical recording medium, comprising a support substrate; and a recording layer and a layer adjacent to the recording layer on the support substrate, the recording layer containing an oxide of one of a metal and a metalloid, a simple substance of an element of the oxide which element is bonded to oxygen, a simple substance of at least one element M, and an oxide of the at least one element M as a principal component, wherein the recording layer includes a region where a constituent element of the adjacent layer is dispersed, recording and reproduction are performable with laser light of a blue wavelength region, and the at least one element M reinforces a light absorbing function with respect to the laser light.

Embodiments also include a write-once-read-many optical recording medium, further comprising an additional layer adjacent to the recording layer, wherein positions at which a number of atoms of the one of the metal and the metalloid of the oxide is a half of a maximum of the number of atoms in the recording layer in an analysis of a composition of the write-once-read-many optical recording medium in a direction of a film thickness thereof are defined as interfaces between the recording layer and the adjacent layer and the additional adjacent layer, and a ratio of the element of the adjacent layer at a center of the recording layer is more than or equal to 5 at % of elements of the recording layer, the center of the recording layer being determined by the interfaces.

Embodiments also include a write-once-read-many optical recording medium, wherein the recording and the reproduction are performed from a side of the support substrate, and the adjacent layer is provided on a side of the recording layer opposite to the side of the support substrate.

Embodiments also include a write-once-read-many optical recording medium, wherein the recording and the reproduction are performed from a side opposite to the support substrate, and the adjacent layer is provided on a side of the recording layer opposite to the support substrate.

Embodiments also include a write-once-read-many optical recording medium, wherein the adjacent layer contains one of an oxide, a nitride, a carbide, a fluoride, and a sulfide, and the constituent element of the adjacent layer dispersed in the region in the recording layer is bonded to one of oxygen, nitrogen, carbon, fluorine, and sulfur in the one of the oxide, the nitride, the carbide, the fluoride, and the sulfide.

Embodiments also include a write-once-read-many optical recording medium, wherein the adjacent layer contains ZnS as a principal component, and the constituent element of the adjacent layer dispersed in the region in the recording layer is Zn.

Embodiments also include a write-once-read-many optical recording medium, further comprising a protective layer, wherein the recording layer, the adjacent layer, and the protective layer are successively stacked in order.

Embodiments also include a write-once-read-many optical recording medium, wherein the one of the metal and the metalloid is bismuth.

Embodiments also include a write-once-read-many optical recording medium, wherein a value of an imaginary part of a complex index of refraction of the recording layer is more than or equal to 0.30 and a value of a real part of the complex index of refraction of the recording layer is more than or equal to 2.20 when the recording layer is exposed to the laser light.

Embodiments also include a write-once-read-many optical recording medium, wherein the one of the metal and the metalloid is bismuth.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

Figure 1:
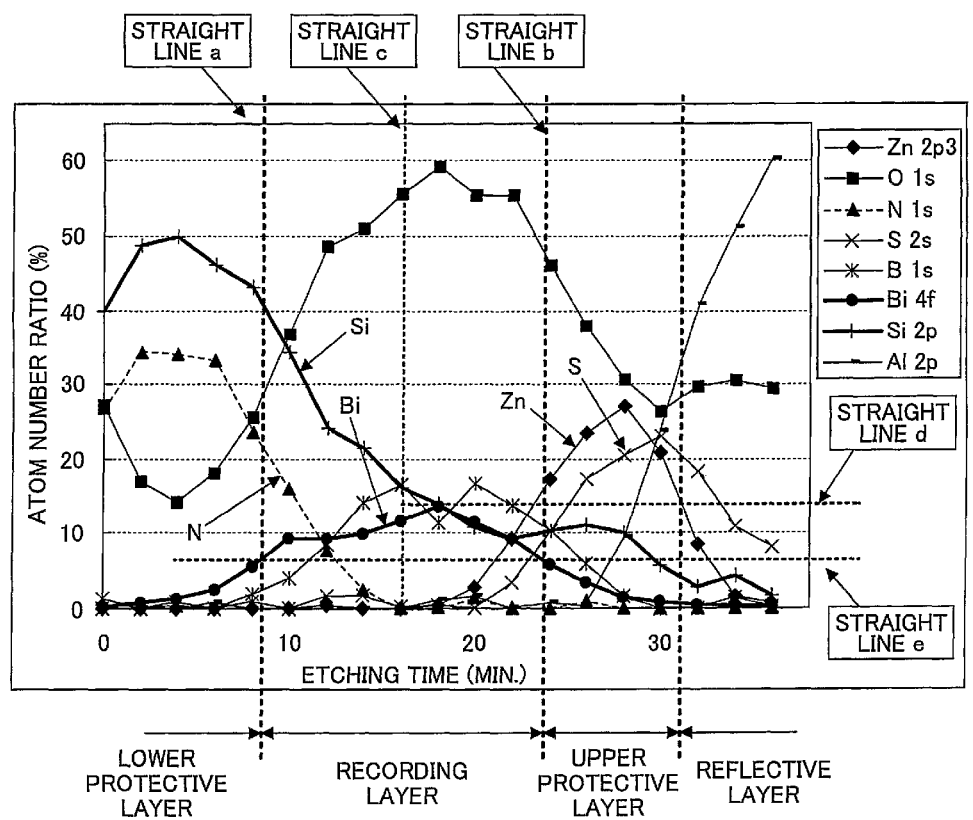
FIG. 1 is a graph showing the results of XPS quantitative analysis of a composition in the film thickness directions with respect to a WORM optical recording medium prepared in Example 7 according to the present invention.

A description is given below of embodiments of the present invention.

In the following description, the expression of reducing the degree of oxidation (increasing the amount of oxygen deficiency) of a metal or metalloid oxide and the expression of causing the oxygen content of a metal or metalloid oxide to be less (lower) than that according to the stoichiometric composition (of the oxide) have the same meaning.

Further, the expression that the degree of oxidation of a metal or metalloid oxide is low or the expression that the oxygen content of a metal or metalloid oxide is less (lower) than that according to the stoichiometric composition includes not only the cases (i) and (ii) but also the case (c) described below. That is, the case is also included where although the oxygen content of an oxide is that of the stoichiometric composition, addition of a metal or metalloid forming the oxide causes an increase in the amount of the metal or metalloid in the recording layer, so that the oxygen content is less than that according to the stoichiometric composition when viewing the composition of the oxide in terms of the number of atoms of the metal or metalloid.

(i) A sputtering target is formed of a metal or metalloid oxide whose oxygen content is that according to the stoichiometric composition, but the oxygen content of the metal or metalloid oxide is less than that according to the stoichiometric composition in the recording layer formed by sputtering.

(ii) A sputtering target is formed of a metal or metalloid oxide whose oxygen content is less than that according to the stoichiometric composition, and the oxygen content of the metal or metalloid oxide is also less than that according to the stoichiometric composition in the recording layer formed by sputtering.

(iii) A sputtering target is formed of a metal or metalloid oxide whose oxygen content is that according to the stoichiometric composition and the simple substance of the metal or metalloid forming the oxide, and the metal or metalloid oxide and the simple substance of the metal or metalloid forming the oxide are also contained in the recording layer formed by sputtering.

The above-described case (i) is that when the stoichiometric composition of an oxide being $X_\alpha O_\beta$, letting X be the element of a metal or metalloid forming the oxide, the composition becomes $X_\alpha O_\gamma$ ($\gamma<\beta$) because of an escape of oxygen at the time of preparation of the sputtering target or during formation of the recording film (layer) (during sputtering).

The above-described case (iii) is as follows. For example, when an element X and its oxide $X_\alpha O_\beta$ are mixed with a molar ratio of n:m, the ratio of the number of atoms of X and the number of atoms of oxygen is $(n+m\alpha):m\beta$. When viewing the oxide of X based on the number of atoms of X $(n+m\alpha)$, the number of oxygen atoms necessary to cause the oxygen content to be compliant with the stoichiometric composition is $(n+m\alpha)\times(\beta/\alpha)$. However, the actual number of atoms is fewer by $n\beta/\alpha$. Accordingly, it is considered that the oxygen content is less than that according to the stoichiometric composition.

In this example, a binary oxide is considered. However, the same concept applies whether the oxide is a ternary oxide (an oxide where three atoms are chemically bonded to one another) or a quaternary oxide (an oxide where four atoms are chemically bonded to one another).

Further, the same concept applies when the recording layer is formed of a mixture of multiple oxides. (There is no chemical bond between atoms forming different oxides.)

According to one embodiment of the present invention, there is provided a write-once-read-many optical recording medium including a support substrate; and at least a recording layer and a layer adjacent to the recording layer (a specific adjacent layer) on the support substrate, the recording layer containing an oxide of one of a metal and a metalloid as a principal component, wherein the recording layer includes a region where a constituent element of the adjacent layer is dispersed (a specific adjacent layer element dispersion region), and recording and reproduction are performable with laser light of a blue wavelength region (Configuration 1).

According to one embodiment of the present invention, there is provided a write-once-read-many optical recording medium including a support substrate; and at least a recording layer and a layer adjacent to the recording layer (a specific adjacent layer) on the support substrate, the recording layer containing an oxide of one of a metal and a metalloid and a simple substance of an element of the oxide as a principal component, the element of the oxide being bonded to oxygen, wherein the recording layer includes a region where a constituent element of the adjacent layer is dispersed (a specific adjacent layer element dispersion region), and recording and reproduction are performable with laser light of a blue wavelength region (Configuration 2).

According to one embodiment of the present invention, there is provided a write-once-read-many optical recording medium including a support substrate; and at least a recording layer and a layer adjacent to the recording layer (a specific adjacent layer) on the support substrate, the recording layer containing an oxide of one of a metal and a metalloid and a simple substance of at least one element M as a principal component, wherein the recording layer includes a region where a constituent element of the adjacent layer is dispersed (a specific adjacent layer element dispersion region), recording and reproduction are performable with laser light of a blue wavelength region, and the at least one element M reinforces a light absorbing function with respect to the laser light (Configuration 3).

According to one embodiment of the present invention, there is provided a write-once-read-many optical recording medium including a support substrate; and at least a recording layer and a layer adjacent to the recording layer (a specific adjacent layer) on the support substrate, the recording layer containing an oxide of one of a metal and a metalloid, a simple substance of at least one element M, and an oxide of the at least one element M as a principal component, wherein the recording layer includes a region where a constituent element of the adjacent layer is dispersed (a specific adjacent layer element dispersion region), recording and reproduction are performable with laser light of a blue wavelength region, and the at least one element M reinforces a light absorbing function with respect to the laser light (Configuration 4).

According to one embodiment of the present invention, there is provided a write-once-read-many optical recording medium including a support substrate; and at least a recording layer and a layer adjacent to the recording layer (a specific adjacent layer) on the support substrate, the recording layer containing an oxide of one of a metal and a metalloid, a simple substance of an element of the oxide which element is bonded to oxygen, a simple substance of at least one element M, and an oxide of the at least one element M as a principal component, wherein the recording layer includes a region where a constituent element of the adjacent layer is dispersed (a specific adjacent layer element dispersion region), recording and reproduction are performable with laser light of a blue wavelength region, and the at least one element M reinforces a light absorbing function with respect to the laser light (Configuration 5).

Additionally, the write-once-read-many optical recording medium as set forth above in any of Configurations 1 through 5, may further include an additional layer adjacent to the recording layer, wherein positions at which the number of atoms of the one of the metal and the metalloid of the oxide is the half of the maximum of the number of atoms in the recording layer in an analysis of the composition of the write-once-read-many optical recording medium in a direction of the film thickness thereof may be defined as interfaces between the recording layer and the adjacent layer and the additional adjacent layer, and the ratio of the element of the adjacent layer at the center of the recording layer is more than or equal to 5 at % of the elements of the recording layer, the center of the recording layer being determined by the interfaces (Configuration 6).

Additionally, in the write-once-read-many optical recording medium as set forth above in any of Configurations 1 through 6, the recording and the reproduction may be performed from the side of the support substrate, and the adjacent layer may be provided on the side of the recording layer opposite to the side of the support substrate (Configuration 7).

Additionally, in the write-once-read-many optical recording medium as set forth above in any of Configurations 1 through 6, the recording and the reproduction may be performed from the side opposite to the support substrate, and the adjacent layer may be provided on the side of the recording layer opposite to the support substrate (Configuration 8).

Additionally, in the write-once-read-many optical recording medium as set forth above in any of Configurations 1 through 8, the adjacent layer may contain one of an oxide, a nitride, a carbide, a fluoride, and a sulfide, and the constituent element of the adjacent layer dispersed in the region in the recording layer may be bonded to one of oxygen, nitrogen, carbon, fluorine, and sulfur in the one of the oxide, the nitride, the carbide, the fluoride, and the sulfide (Configuration 9).

Additionally, in the write-once-read-many optical recording medium as set forth above in Configuration 9, the adjacent layer may contain ZnS as a principal component, and the constituent element of the adjacent layer dispersed in the region in the recording layer may be Zn (Configuration 10).

Additionally, the write-once-read-many optical recording medium as set forth above in any of Configurations 1 through 8 may further include a protective layer, wherein the recording layer, the adjacent layer, and the protective layer may be successively stacked in order, and the adjacent layer may contain a simple substance of at least one element M as a principal component, the at least one element M reinforcing a light absorbing function with respect to the laser light (Configuration 11).

According to one embodiment of the present invention, there is provided a write-once-read-many optical recording medium including at least a support substrate; and a recording layer on the support substrate, wherein recording and reproduction are performable with laser light of a blue wavelength region, the recording layer includes an M element dispersion region formed of at least one element M reinforcing a light absorbing function with respect to the laser light, the at least one element M being buried in the recording layer after formation of the recording layer, and the recording layer is one of (a) a recording layer containing an oxide of one of a metal and a metalloid as a principal component; (b) a recording layer containing an oxide of one of a metal and a metalloid and a simple substance of an element of the oxide which element is bonded to oxygen as a principal component; (c) a recording layer containing an oxide of one of a metal and a metalloid and the simple substance of the at least one element M as a principal component; (d) a recording layer containing an oxide of one of a metal and a metalloid, the simple substance of the at least one element M, and an oxide of the at least one element M as a principal component; and (e) a recording layer containing an oxide of one of a metal and a metalloid, a simple substance of an element of the oxide which element is bonded to oxygen, the simple substance of the at least one element M, and an oxide of the at least one element M as a principal component (Configuration 12).

Additionally, in the write-once-read-many optical recording medium as set forth above in any of Configurations 1 through 12, the one of the metal and the metalloid may be bismuth (Configuration 13).

Additionally, in the write-once-read-many optical recording medium as set forth above in any of Configurations 1 through 13, the value of the imaginary part of the complex index of refraction of the recording layer may be more than or equal to 0.30 and the value of the real part of the complex index of refraction of the recording layer may be more than or equal to 2.20 when the recording layer is exposed to the laser light (Configuration 14).

A detailed description is given of the above-described configurations of the present invention.

Metal or metalloid oxides, which do well at absorbing light of the blue wavelength region in general, facilitate good recording. However, further improvement of recording sensitivity is desirable for a forecasted future increase in recording rate.

According to one aspect of the present invention, the composition of a recording layer is controlled with a specific adjacent layer by providing in the recording layer a region where a constituent element of the specific adjacent layer is dispersed (specific adjacent layer element dispersion region) in order to increase recording sensitivity without degrading recording and reproduction characteristics. That is, in order to improve the recording sensitivity of the recording layer containing at least a metal or metalloid oxide as a principal component, the composition of the recording layer is indirectly controlled by providing the specific adjacent layer adjacent to the recording layer instead of directly controlling the composition or the degree of oxidation of the recording layer as conventionally performed. Formation of the specific adjacent layer element dispersion region in the recording layer improves recording sensitivity because the element of the specific adjacent layer present in the region increases the absorption coefficient of the recording layer with respect to recording and reproduction laser light. As appreciated from the above description, the specific adjacent layer according to the present invention is an adjacent layer for forming the specific adjacent layer element dispersion region in the recording layer. As described below, an upper protective layer or a lower protective layer serves as the specific adjacent layer in a normal layer structure.

The specific adjacent layer element dispersion region may be formed in the recording layer by, for example, the following methods.

Providing a specific adjacent layer adjacent to the recording layer and thereafter applying heat to the medium, thereby diffusing a constituent element of the specific adjacent layer into the recording layer.

Providing a specific adjacent layer adjacent to the recording layer and thereafter exposing the medium to light, thereby diffusing a constituent element of the specific adjacent layer into the recording layer.

Burying a constituent element of a specific adjacent layer into the recording layer during formation of the specific adjacent layer on the recording layer by a vacuum process.

Examples of vacuum processes include PVD (Physical Vapor Deposition) techniques such as vacuum evaporation, sputtering, and ion plating and CVD (Chemical Vapor Deposition) techniques such as plasma polymerization. Of those, sputtering is the most preferable because of its simplicity and high effectiveness.

Further, it is preferable to reduce the packing density (density) of the recording layer in order to make the constituent element of the specific adjacent layer easily buriable into the recording layer during formation of the specific adjacent layer by sputtering. Voids may be generated in the recording layer for this purpose. As a result, it is possible to bury the constituent element of the specific adjacent layer into the recording layer with efficiency. If the packing density of the recording layer is high, it may be difficult to indirectly control the composition of the recording layer with the specific adjacent layer.

The packing density of the recording layer may be reduced by reducing the packing density of a sputtering target for forming the recording layer or by controlling sputtering conditions.

Examples of sputtering conditions include sputtering power, vacuum (degree), and the flow rate of sputtering gas, and it is preferable to control the flow rate of sputtering gas. In the case of reducing the packing density of the recording layer with this method, it is the most preferable to increase the flow rate of sputtering gas.

Examples of sputtering gas include $N_2$, He, Kr, Ne, Ar, Xe, $O_2$, $H_2$, $NH_3$, $CH_4$, and $H_2S$. Of those, Ar is preferable.

Further, such a material may be selected as the material of the specific adjacent layer that starts to react at the interface between the recording layer and the specific adjacent layer in a short period of time after formation of the specific adjacent layer on the recording layer by sputtering so that the constituent element of the specific adjacent layer enters and is diffused into the recording layer.

The composition of the recording layer of the present invention is controlled with the specific adjacent layer formed on the recording layer. Therefore, there is no need for fine control of the flow rate of oxygen or fine control of the composition of the sputtering target at the time of forming the recording layer. Likewise, there is no need for fine control of film formation conditions at the time of forming the specific adjacent layer. Accordingly, the recording layer of the present invention can be formed with an extremely simple and highly productive method.

That is, according to one aspect of the present invention, to form the recording layer, it is desirable to reduce the packing density of the recording layer to some extent and appropriately select the material of the specific adjacent layer.

Conventionally proposed techniques include a large number of WORM optical recording media in which a layer containing a sulfide is provided adjacent to a recording layer formed of an oxide. However, a recording layer having a specific adjacent layer element dispersion region for increasing sensitivity as in the present invention cannot be formed. That is, the composition distribution in the recording layer according to the present invention is not conventionally available.

Further, according to one aspect of the present invention, the recording sensitivity of the recording layer can be indirectly improved with the specific adjacent layer provided adjacent to the recording layer. Therefore, if the present invention is applied to the case where, for example, a recording layer sputtering target having a composition of increased recording sensitivity is difficult to prepare or has poor durability, there is no need to force the recording layer sputtering target to have a high sensitivity composition, so that it is possible to increase productivity.

The recording layer may be formed of multiple metal or metalloid oxides instead of a single metal or metalloid oxide. For example, the recording layer may be formed of a mixture of an oxide whose stoichiometric composition is $X_\alpha O_\beta$ and an oxide whose stoichiometric composition is $Z_\gamma O_\delta$.

However, in order to increase recording sensitivity, it is preferable that the oxygen content of at least one of the oxides be less than that according to the stoichiometric composition, and it is further preferable that the oxygen content of one of the oxides which one is not strongly related to a recording principle be less than that according to the stoichiometric composition.

That is, as described above, if the oxygen content of a metal or metalloid oxide strongly related to a recording principle is excessively lower than that according to the stoichiometric composition, recording and reproduction characteristics or recording sensitivity may be all the worse for it. Therefore, it is effective to increase recording sensitivity by causing the oxygen content of an oxide that is not the oxide strongly related to a recording principle to be less than that according to the stoichiometric composition.

It adds to effectiveness to take the following measures to increase the sensitivity of the recording layer.

Reducing the oxygen content of a metal or metalloid oxide to be less than that according to the stoichiometric composition.

Causing a metal or metalloid oxide to contain the simple substance of at least one element M that reinforces a light absorbing function with respect to recording and reproduction laser light.

According to the WORM optical recording medium of the present invention, the source of a recording principle is a metal or metalloid oxide. Accordingly, a wavelength that increases the absorption coefficient of the metal or metalloid oxide is suitable as a recording and reproduction wavelength, and its wavelength range is 350 nm through 500 nm. Accordingly, the WORM optical recording medium of the present invention allows recording and reproduction with laser light of the blue wavelength region (350 nm through 500 nm). Preferably, the wavelength of the laser light is shorter than 450 nm. In particular, good recording and reproduction is performable with laser light at or around 405 nm.

However, it is possible to use a wavelength over 500 nm if a compound or element that reinforces an absorbing function with respect to recording and reproduction laser light is appropriately selected and added to the metal or metalloid oxide. Further, if semiconductor lasers become increasingly shorter in wavelength in the future so that it is possible to ensure sufficient transmittance of a support substrate material or a cover layer, it is also possible to use a recording and reproduction wavelength shorter than 350 nm.

Formation of a specific adjacent layer element dispersion region in the recording layer may be determined or confirmed using the following methods.

Rutherford Backscattering Spectrometry (RBS)
Secondary Ion Mass Spectrometry (SIMS)
Auger Electron Spectroscopy (AES)
X-ray Photoelectron Spectroscopy (XPS)
Glow Discharge Spectroscopy (GDS)

Of those, RBS and XPS have been found preferable as a result of repeated comparative studies by the inventors of the present invention.

As the element M added to the recording layer, those elements having high melting points (higher than or equal to 600° C.) and low thermal conductivities (lower than or equal to 100 W/m·k) are suitable.

It is preferable to cause the recording layer to contain an element of a high melting point because this prevents recording from causing fusion so that there is no concern about degradation of recording and reproduction characteristics. Further, elements that are low in thermal conductivity are preferable because they reduce thermal interference between recording marks so that there is no concern about degradation of recording and reproduction characteristics.

However, elements having low melting points or high thermal conductivities may also be suitably used. This is because the added element is dispersed in a metal or metalloid matrix so as to be present as fine particles, so that compared with the case of being present in a bulk state, degradation of characteristics through fusion is less likely to occur and the thermal conductivity is sufficiently reduced.

The film thickness of the recording layer is preferably in a range of 5 nm to 30 nm, and more preferably, in a range of 5 nm to 15 nm. If the film thickness is less than 5 nm, it is difficult to ensure sufficient recording sensitivity even if the recording layer has a better (reinforced) light absorption function with respect to recording and reproduction laser light. Further, if the film thickness exceeds 30 nm, the reflectance of the WORM optical recording medium sharply decreases and the thermal conductivity becomes too high, so that there may be degradation of recording and reproduction characteristics.

Next, a description is given, based on the overview of the present invention given above, of each of Configurations 1 through 14.

According to Configuration 1 of the present invention, a write-once-read-many optical recording medium includes a support substrate; and at least a recording layer and a layer adjacent to the recording layer (a specific adjacent layer) on the support substrate, the recording layer containing an oxide of one of a metal and a metalloid as a principal component, wherein the recording layer includes a region where a constituent element of the adjacent layer is dispersed (a specific adjacent layer element dispersion region), and recording and reproduction are performable with laser light of a blue wavelength region. The term "principal component" means that the content (mol %) of the metal or metalloid oxide is the largest in the recording layer.

According to Configuration 2 of the present invention, a write-once-read-many optical recording medium includes a support substrate; and at least a recording layer and a layer adjacent to the recording layer (a specific adjacent layer) on the support substrate, the recording layer containing an oxide of one of a metal and a metalloid and a simple substance of an element of the oxide as a principal component, the element of the oxide being bonded to oxygen, wherein the recording layer includes a region where a constituent element of the adjacent layer is dispersed (a specific adjacent layer element dispersion region), and recording and reproduction are performable with laser light of a blue wavelength region. The term "principal component" means the combined content (mol %) of the metal or metalloid oxide and the simple substance of the element is the largest in the recording layer. Further, the term "simple substance" of the element indicates that the element is not chemically bonded to another element.

According to Configuration 2 of the present invention, since the recording layer contains the simple substance of a metal or metalloid element, the absorption coefficient with respect to recording and reproduction laser light increases in the recording layer, so that the recording sensitivity is improved.

According to Configuration 3 of the present invention, a write-once-read-many optical recording medium includes a support substrate; and at least a recording layer and a layer adjacent to the recording layer (a specific adjacent layer) on the support substrate, the recording layer containing an oxide of one of a metal and a metalloid and a simple substance of at least one element M as a principal component, wherein the recording layer includes a region where a constituent element of the adjacent layer is dispersed (a specific adjacent layer element dispersion region), recording and reproduction are performable with laser light of a blue wavelength region, and the at least one element M reinforces a light absorbing function with respect to the laser light. The term "principal component" means the combined content (mol %) of the metal or metalloid oxide and the simple substance of the element M is the largest in the recording layer. The definition of the "simple substance" of the element is the same as described above.

According to Configuration 3 of the present invention, since the recording layer contains the simple substance of the above-described element M, the absorption coefficient with respect to recording and reproduction laser light increases in the recording layer, so that the recording sensitivity is improved.

Further, it is preferable that a sputtering target for the recording layer contain the element M so that the simple substance of the element M is present in the recording layer at the time of forming the recording layer by sputtering. In the sputtering target, the element M may be present as a simple substance or may form a compound or may be a mixture of both.

In the case of the element M forming a compound, the element M and its compound may be selected so that the bond of the compound of the element M is partially broken during sputtering so that the simple substance of M is present in the recording layer. Further, it is preferable that the compound of the element M have the element M excessively added thereto compared with its stoichiometric composition.

According to Configuration 4 of the present invention, a write-once-read-many optical recording medium includes a support substrate; and at least a recording layer and a layer adjacent to the recording layer (a specific adjacent layer) on the support substrate, the recording layer containing an oxide of one of a metal and a metalloid, a simple substance of at least one element M, and an oxide of the at least one element M as a principal component, wherein the recording layer includes a region where a constituent element of the adjacent layer is dispersed (a specific adjacent layer element dispersion region), recording and reproduction are performable with laser light of a blue wavelength region, and the at least one element M reinforces a light absorbing function with respect to the laser light. The term "principal component" means that the combined content (mol %) of the metal or metalloid oxide, the simple substance of the element M, and the oxide of the element M is the largest in the recording layer. The definition of the "simple substance" of the element is the same as described above.

According to Configuration 4 of the present invention, because of the presence of the simple substance of the element M, the absorption coefficient with respect to recording and reproduction laser light increases in the recording layer, so that the recording sensitivity is improved the same as in Configuration 3.

Further, compared with Configuration 3, the recording layer further contains the oxide of the element M. Accordingly, the thermal conductivity of the recording layer is reduced, so that it is possible to reduce the thermal interference between recording marks and recording and to improve recording and reproduction characteristics.

According to Configuration 5 of the present invention, a write-once-read-many optical recording medium includes a support substrate; and at least a recording layer and a layer adjacent to the recording layer (a specific adjacent layer) on the support substrate, the recording layer containing an oxide of one of a metal and a metalloid, a simple substance of an element of the oxide which element is bonded to oxygen, a simple substance of at least one element M, and an oxide of the at least one element M as a principal component, wherein the recording layer includes a region where a constituent element of the adjacent layer is dispersed (a specific adjacent layer element dispersion region), recording and reproduction are performable with laser light of a blue wavelength region, and the at least one element M reinforces a light absorbing function with respect to the laser light. The term "principal component" means that the combined content (mol %) of the metal or metalloid oxide, the simple substance of the element, the simple substance of the element M, and the oxide of the element M is the largest in the recording layer. The definition of the "simple substance" of the element is the same as described above.

According to Configuration 5, because of the presence of the metal or metalloid oxide and the element M in the recording layer, the absorption coefficient with respect to recording and reproduction laser light increases in the recording layer, so that the recording sensitivity is improved as much as or more than in Configurations 2 through 4.

Further, the effect of causing the recording layer to contain the oxide of the element M is the same as in Configuration 4.

According to Configuration 6 of the present invention, the write-once-read-many optical recording medium as set forth above in any of Configurations 1 through 5 further includes an additional layer adjacent to the recording layer, wherein positions at which the number of atoms of the one of the metal and the metalloid of the oxide is the half of the maximum of the number of atoms in the recording layer in an analysis of the composition of the write-once-read-many optical recording medium in a direction of the film thickness thereof may be defined as interfaces between the recording layer and the adjacent layer and the additional adjacent layer, and the ratio of the element of the adjacent layer at the center of the recording layer is more than or equal to 5 at % of the elements of the recording layer, the center of the recording layer being determined by the interfaces.

Configuration 6 defines the condition and the amount of the constituent element of the specific adjacent layer contained in the specific adjacent layer element dispersion region of the present invention. However, this definition is merely one point of view, and other definitions may be possible when viewed from different angles.

According to Configuration 7 of the present invention, in the write-once-read-many optical recording medium as set forth above in any of Configurations 1 through 6, the recording and the reproduction may be performed from the side of the support substrate, and the adjacent layer may be provided on the side of the recording layer opposite to the side of the support substrate.

Methods of forming a specific adjacent layer element dispersion region in the recording layer include those described above, of which the most preferable is the one that forms a specific adjacent layer by a vacuum process such as sputtering after formation of the recording layer. In this case, the specific adjacent layer should be formed on a somewhat thick support substrate in order to ensure mechanical characteristics after the film formation. Accordingly, the position of the specific adjacent layer is determined based on the support substrate and the direction in which recording and reproduction are performed.

That is, in the case of a WORM optical recording medium on which recording and reproduction are performed from the support substrate side, it is an adjacent layer on the side of the recording layer opposite to the side from which recording and reproduction (recording and reproduction side) are performed that is formed after formation of the recording layer. Therefore, the specific adjacent layer element dispersion region is formed in the recording layer with this "opposite-side" adjacent layer serving as the specific adjacent layer. Accordingly, it is possible to increase the recording sensitivity of the recording layer by appropriately selecting the material of this specific adjacent layer.

On the other hand, of the adjacent layers of the recording layer, the one on the recording and reproduction side is formed prior to the recording layer. Therefore, the "recording-and-reproduction-side" adjacent layer cannot form a specific adjacent layer element dispersion region in the recording layer, and thus cannot be the specific adjacent layer of the present invention.

According to Configuration 8 of the present invention, in the write-once-read-many optical recording medium as set forth above in any of Configurations 1 through 6, the recording and the reproduction may be performed from the side opposite to the support substrate, and the adjacent layer may be provided on the side of the recording layer opposite to the support substrate.

As described above, the position of the specific adjacent layer is determined based on the support substrate and the direction in which recording and reproduction are performed in the case of forming the specific adjacent layer by a vacuum process such as sputtering after formation of the recording layer.

That is, in the case of a WORM optical recording medium on which recording and reproduction are performed from the side opposite to the support substrate side, it is an adjacent layer on the recording and reproduction side of the recording layer that is formed after formation of the recording layer. Therefore, the specific adjacent layer element dispersion region is formed in the recording layer with this "recording-and-reproduction-side" adjacent layer serving as the specific adjacent layer. Accordingly, it is possible to increase the recording sensitivity of the recording layer by appropriately selecting the material of this specific adjacent layer.

On the other hand, of the adjacent layers of the recording layer, the one on the side opposite to the recording and reproduction side is formed prior to the recording layer. Therefore, this "opposite-side" adjacent layer cannot form a specific adjacent layer element dispersion region in the recording layer, and thus cannot be the specific adjacent layer of the present invention.

According to Configuration 9 of the present invention, in the write-once-read-many optical recording medium as set forth above in any of Configurations 1 through 8, the adjacent layer may contain one of an oxide, a nitride, a carbide, a fluoride, and a sulfide, and the constituent element of the adjacent layer dispersed in the region in the recording layer may be bonded to one of oxygen, nitrogen, carbon, fluorine, and sulfur in the one of the oxide, the nitride, the carbide, the fluoride, and the sulfide.

The specific adjacent layer may implement the following function, and preferable materials for the specific adjacent layer may include oxides, nitrides, carbides, fluorides, and sulfides.

Controlling the transfer (entrance and exit) of heat generated in the recording layer (affecting recording sensitivity or the degree of modulation).

Controlling reflectance (affecting recording sensitivity).

Protecting the recording layer from moisture or gas such as oxygen that enters from outside (affecting retention [storage] reliability).

As described above, in order to cause a constituent element of the oxide, nitride, carbide, fluoride, or sulfide of the specific adjacent layer to enter the recording layer, the simplest and the most effective method is to bury the constituent element of the specific adjacent layer into the recording layer at the time of forming the specific adjacent layer on the recording layer by a vacuum process such as sputtering.

In this case, either one of the following methods may be used.

Selecting a specific adjacent layer material (oxide, nitride, carbide, fluoride, or sulfide) whose oxygen content, nitrogen content, carbon content, fluorine content, or sulfur content is that according to the stoichiometric composition and whose bond is broken during formation of the specific adjacent layer, or selecting a specific adjacent layer material (oxide, nitride, carbide, fluoride, or sulfide) whose oxygen content, nitrogen content, carbon content, fluorine content, or sulfur content is that according to the stoichiometric composition, and forming the specific adjacent layer under conditions that cause breakage of the bond of the material.

Selecting a specific adjacent layer material (oxide, nitride, carbide, fluoride, or sulfide) whose oxygen content, nitrogen content, carbon content, fluorine content, or sulfur content is that according to the stoichiometric composition and also remains the same (equal to that according to the stoichiometric composition) immediately after formation of the specific adjacent layer but whose constituent element is diffused into the recording layer through reaction with the material of the recording layer.

In addition to those described above, it is also effective to cause the oxygen, nitrogen, carbon, fluorine, or sulfur content of an oxide, nitride, carbide, fluoride, or sulfide that is a sputtering target for the specific adjacent layer to be less than that according to the stoichiometric composition.

These methods make it possible to efficiently form a specific adjacent layer element dispersion region in the recording layer without damaging the above-described original functions of the specific adjacent layer.

Any element may be selected to be bonded to oxygen, nitrogen, carbon, fluorine, or sulfur to form the oxide, nitride, carbide, fluoride, or sulfide of the specific adjacent layer. This is because if the constituent element of the specific adjacent layer is caused to be present as a simple substance in the recording layer, substantially any solid element has a light absorption function better than that of the metal or metalloid oxide of the recording layer, so that it is possible to improve recording sensitivity.

According to Configuration 10 of the present invention, in the write-once-read-many optical recording medium as set forth above in Configuration 9, the adjacent layer may contain ZnS as a principal component, and the constituent element of the adjacent layer dispersed in the region in the recording layer may be Zn. The term "principal component" here means occupying 50 mol % or more of the entire material.

A sputtering target containing ZnS as a principal component is the most common sulfide and is a preferable material in terms of both stability and cost.

ZnS may be used in mixture with another material. For example, $ZnS.SiO_2$ is a preferable material.

According to Configuration 11 of the present invention, the write-once-read-many optical recording medium as set forth above in any of Configurations 1 through 8 may further include a protective layer, wherein the recording layer, the adjacent layer, and the protective layer may be successively stacked in order, and the adjacent layer may contain a simple substance of at least one element M as a principal component, the at least one element M reinforcing a light absorbing function with respect to the laser light.

In Configurations 9 and 10 of the present invention, the constituent element of the specific adjacent layer forming a specific adjacent layer element dispersion region is caused to be present as a compound in the specific adjacent layer and the sputtering target of the specific adjacent layer.

On the other hand, in Configuration 11, the constituent element of the specific adjacent layer forming a specific adjacent layer element dispersion region is caused to be present in the specific adjacent layer and the sputtering target of the specific adjacent layer so that the simple substance of the element is a principal component in the specific adjacent layer and the sputtering target of the specific adjacent layer.

If the WORM optical recording medium has a layer structure where a lower protective layer, a recording layer, an upper protective layer, and a reflective layer are successively stacked on a support substrate, the upper protective layer corresponds to a specific adjacent layer and at the same time has the function of properly dissipating heat generated in the recording layer from the reflective layer and the function of controlling reflectance in order to properly confine the heat generated in the recording layer and to reduce the interference between recording marks. Therefore, according to the above-described configuration, the upper protective layer should have the function of controlling the transfer of heat, the function of controlling reflectance, and the function of forming a specific adjacent layer element dispersion region in the recording layer.

On the other hand, according to Configuration 11, the range of choices for the material of the upper protective layer is widened, the range of choices for the film thickness of the upper protective layer is widened, and the material and the film thickness of the upper protection do not have to optimize all of the above-described three functions.

According to Configuration 11, the specific adjacent layer is caused to have only the function of forming a specific adjacent layer element dispersion region, and a layer structure is provided where, for example, a lower protective layer, a recording layer, a specific adjacent layer forming a specific adjacent layer element dispersion region, an upper protective layer, and a reflective layer are successively stacked on a support substrate. As a result, the specific adjacent layer does not have to have the heat insulation and heat dissipation function or the reflectance control function, so that there is no need to cause at least one element that reinforces a light absorption function with respect to recording and reproduction laser light to be present as a compound.

As a result, according to Configuration 11 of the present invention, the specific adjacent layer can contain the at least one element M that reinforces a light absorption function with respect to recording and reproduction laser light as a principal component, so that it is possible to bury the constituent element of the specific adjacent layer which element forms the specific adjacent layer element dispersion region directly into the recording layer. As a result, it is possible to further increase the absorption coefficient of the recording layer with respect to recording and reproduction laser light, thus increasing recording sensitivity.

In order to prevent a significant decrease in reflectance or to prevent degradation of recording and reproduction characteristics due to an increase in thermal conductivity, the film thickness of the specific adjacent layer is less than or equal to 10 nm, preferably, less than or equal to 5 nm.

Further, according to Configuration 11, the specific adjacent layer does not have to have the heat insulation and heat dissipation function or the reflectance control function. Therefore, all the material of the specific adjacent layer may be buried into the recording layer. Accordingly, the film thickness of the specific adjacent layer may be substantially zero. If the film thickness of the specific adjacent layer is zero, there is no specific adjacent layer element dispersion region in the recording layer. Such a case is included in Configuration 12 of the present invention. That is, in place of the specific adjacent layer element dispersion region, an M element dispersion region formed of the simple substance of at least one element M that reinforces a light absorption function with respect to recording and reproduction laser light is formed in the recording layer. The M element dispersion region has the same function as the above-described specific adjacent layer element dispersion region.

The element M is not limited to a particular element as long as the element reinforces a light absorption function with respect to recording and reproduction laser light. The element M may be either the same as or different from the element M described above in Configurations 3, 4, and 5.

According to Configuration 13 of the present invention, in the write-once-read-many optical recording medium as set forth above in any of Configurations 1 through 12, the one of the metal and the metalloid may be bismuth. The effectiveness of bismuth is as described above.

According to Configuration 14 of the present invention, in the write-once-read-many optical recording medium as set forth above in any of Configurations 1 through 13, the value of the imaginary part of the complex index of refraction of the recording layer may be more than or equal to 0.30 and the value of the real part of the complex index of refraction of the recording layer may be more than or equal to 2.20 when the recording layer is exposed to the laser light.

As a result, in each of a single-layer WORM optical recording medium and a multilayer WORM optical recording medium, it is possible to increase recording sensitivity without significant reduction in the reflectance of the medium. Further, in the multilayer WORM optical recording medium, by causing the value of the real part to be more than or equal to 2.20, it is possible to increase the transmittance of a recording layer through which recording and reproduction light passes (any recording layer other than the recording layer positioned farthest from the direction of the recording and reproduction light), so that it is possible to improve the recording and reproduction characteristics of the farthest recording layer. Further, if the values of the complex index of refraction of the recording layer are within the above-described ranges, it is possible to achieve high sensitivity irrespective of the wavelength of recording and reproduction laser light.

Structures for the WORM optical recording medium of the present invention are preferably, but not limited to, the following:

(I) support substrate/recording layer/upper protective layer/reflective layer;

(II) support substrate/lower protective layer/recording layer/upper protective layer;

(III) support substrate/lower protective layer/recording layer/upper protective layer/reflective layer;

(IV) support substrate/upper protective layer/recording layer/lower protective layer/cover layer; and (V) support substrate/reflective layer/upper protective layer/recording layer/lower protective layer/cover layer.

The lower protective layer or the upper protective layer may be formed of multiple layers. Further, a "multi-tier" structure may be formed using any of the above-described structures (I) through (V) as a basis. For example, in the case of forming a "two-tier" structure using the structure (I) as a basis, the "two-tier" structure may be substrate/recording layer/upper protective layer/reflective layer (translucent layer)/bonding layer/recording layer/upper protective layer/reflective layer/substrate.

In the case of forming each layer by a vacuum process, in the above-described structures (I) through (III), where recording and reproduction are performed through the support substrate, the specific adjacent layer is the upper protective layer because the upper protective layer is formed next to the recording layer.

On the other hand, in the structures (IV) and (V), where recording and reproduction are performed through the cover layer, the specific adjacent layer is the lower protective layer because the lower protective layer is formed next to the recording layer.

In the structures (I) through (III) and (V), the upper protective layer is provided between the recording layer and the reflective layer, and has a principal function of controlling recording sensitivity and the reflective layer.

If the film thickness of the upper protective layer is too small, the heat generated in the recording layer is dissipated from the reflective layer more than necessary. Accordingly, the film thickness of the upper protective layer is preferably 10 nm or more. Further, if the film thickness of the upper protective layer is too large, the heat generated in the recording layer is less likely to be dissipated from the reflective layer so as to increase the thermal interference between recording marks. Accordingly, the film thickness of the upper protective layer is preferably 100 nm or less.

In any of the structures (II) through (V), the lower protective layer is used to ensure the retention (storage) reliability of the recording layer. That is, the lower protective layer protects the recording layer from oxygen, moisture, or other gas transmitted through the substrate or cover layer.

Accordingly, in order to satisfactorily protect the recording layer from oxygen, moisture, or other gas transmitted through the substrate or cover layer, it is preferable that the film thickness of the lower protective layer be 15 nm or more. On the other hand, in terms of productivity, it is preferable that the film thickness of the lower protective layer be 100 nm or less.

Examples of materials that may be used for the upper protective layer and the lower protective layer include oxides and non-oxides. Examples of oxides include simple oxides such as $B_2O_5$, $Sm_2O_3$, $Ce_2O_3$, $Al_2O_3$, MgO, BeO, $ZrO_2$, $UO_2$, and $ThO_2$; oxides derived from silicates such as $SiO_2$, $2MgO \cdot SiO_2$, $MgO \cdot SiO_2$, $CaO \cdot SiO_2$, $ZrO_2 \cdot SiO_2$, $3Al_2O_3 \cdot 2SiO_2$, $2MgO \cdot 2Al_2O_3 \cdot 5SiO_2$, and $Li_2O \cdot Al_2O_3 \cdot 4SiO_2$; multiple oxides such as $Al_2TiO_5$, $MgAl_2O_4$, $Ca_{10}(PO_4)_6(OH)_2$, $BaTiO_3$, $LiNbO_3$, PZT [$Pb(Zr, Ti)O_3$], PLZT [(Pb, La)(Zr, Ti)$O_3$], and ferrite. Examples of non-oxides include nitrides such as $Si_3N_4$, AlN, BN, and TiN; carbides such as SiC, $B_4C$, TiC, and WC; borides such as $LaB_6$, $TiB_2$, and $ZrB_2$; sulfides such as ZnS, CdS, and $MoS_2$; silicides such as $MoSi_2$; and carbons such as amorphous carbon, graphite, and diamond.

It is also possible to use organic materials such as dyes and resins for the upper protective layer and the lower protective layer.

Examples of dyes include polymethine dyes, naphthalocyanine dyes, phthalocyanine dyes, squarylium dyes, chroconium dyes, pyrylium dyes, naphthoquinone dyes, anthraquinone (indanthrene) dyes, xanthene dyes, triphenylmethane dyes, azulene dyes, tetrahydrocholine dyes, phenanthrene dyes, triphenothiazine dyes, azo dyes, formazan dyes, and their metal complex compounds.

Examples of resins include polyvinyl alcohols, polyvinyl pyrrolidones, cellulose nitrates, cellulose acetates, ketone resins, acrylic resins, polystyrene resins, urethane resins, polyvinyl butyrals, polycarbonates, and polyolefins. Each of these resins may be used alone or in combination with one or more of the other resins.

Organic material layers may be formed by common methods such as vapor deposition, sputtering, CVD, and application of a solvent. In the case of adopting solvent application, an organic material such as one of those described above is dissolved into an organic solvent, and the solvent may be applied by a commonly used coating method such as spraying, roller coating, dipping, or spin coating.

Examples of common organic solvents to be used include alcohols such as methanol, ethanol, and isopropanol; ketones such as acetone, methyl ethyl ketone, and cyclohexanone; amides such as N,N-dimethylacetamide and N,N-dimethylformamide; sulfoxides such as dimethylsulfoxide; ethers such as tetrahydrofuran, dioxane, diethyl ether, and ethylene glycol monomethyl ether; esters such as methyl acetate and ethyl acetate; aliphatic halocarbons such as chloroform, methylene chloride, dichloroethane, carbon tetrachloride, and trichloroethane; aromatics such as benzene, xylene, monochlorobenzene, and dichlorobenzene; cellosolves such as methoxyethanol and ethoxyethanol; and hydrocarbons such as hexane, pentane, cyclohexane, and methylcyclohexane.

The reflective layer may be formed on the substrate by vapor deposition, sputtering, or ion plating. In particular, it is preferable to form the reflective layer by sputtering. A description is given in detail below of a method of forming the reflective layer using sputtering.

Ar is preferred as a discharge gas used for sputtering. The sputtering conditions are preferably an Ar flow rate of 1 to 50 sccm, a power level of 0.5 to 10 kW, and a film formation time of 0.1 to 30 seconds; more preferably an Ar flow rate of 3 to 20 sccm, a power level of 1 to 7 kW, and a film formation time of 0.5 to 15 seconds; and yet more preferably an Ar flow rate of 4 to 10 sccm, a power level of 2 to 6 kW, and a film formation time of 1 to 5 seconds.

The sputtering conditions preferably have at least one of the Ar flow rate, the power level, and the film formation time within the corresponding range described above, more preferably have two or more of them within the corresponding ranges described above, and yet more preferably have all of them within the corresponding ranges described above.

Forming the reflective layer under such conditions increases reflectance and further increases corrosion resistance, so that it is possible to obtain an optical recording medium having good recording characteristics.

The film thickness of the reflective layer is preferably 20 nm to 200 nm, more preferably 25 nm to 180 nm, and yet more preferably 30 nm to 160 nm. However, in the case of applying the reflective layer of the present invention to multilayer optical recording media, the lower limit of the film thickness of the reflective layer is not limited to the above.

If the film thickness of the reflective layer is less than 20 nm, a desired reflectance may not be obtained, there may be a decrease in reflectance at the time of storage, or it may not be possible to ensure sufficient recording amplitude. If the film thickness of the reflective layer is more than 200 nm, the formed film may have a coarse surface so as to cause a decrease in reflectance. Further, a film thickness over 200 nm is not preferable in terms of productivity, either.

The film formation rate of the reflective layer is preferably 6 nm/s to 95 nm/s, more preferably 7 nm/s to 90 nm/s, and yet more preferably 8 nm/s to 80 nm/s. If the film formation rate is lower than 6 nm/s, entrance of oxygen is likely to occur during sputtering, so that the reflectance or corrosion resistance of the reflective layer may be reduced by oxidation. If the film formation rate is higher than 95 nm/s, there is a large increase in temperature so that the substrate may warp.

The material of the substrate is not limited in particular as long as it has good thermal and mechanical characteristics, and in the case of performing recording and reproduction from the substrate side (through the substrate), has good light transmission characteristics.

Examples of the material of the substrate include polycarbonates, polymethyl methacrylates, amorphous polyolefins, cellulose acetates, and polyethylene terephthalates, of which polycarbonates and amorphous polyolefins are preferable.

The thickness of the substrate differs depending on purposes, and is not limited in particular.

The material of a protective layer (environmental barrier layer) formed on the reflective layer or the light transmission layer (cover layer) is not limited in particular as long as the material can protect the reflective layer or the light transmission layer from external forces. The material may be organic or inorganic. Examples of organic materials include thermoplastic resins, thermosetting resins, electron beam curable resins, and ultraviolet curable resins. Examples of inorganic materials include $SiO_2$, $Si_3N_4$, $MgF_2$, and $SnO_2$.

In the case of using a thermoplastic resin or a thermosetting resin, the protective layer may be formed by applying and drying coating liquid formed by dissolving the thermoplastic or thermosetting resin into an appropriate solvent.

In the case of using an ultraviolet curable resin, the protective layer may be formed by directly applying the ultraviolet curable resin and hardening it through exposure to ultraviolet rays or by applying coating liquid formed by dissolving the ultraviolet curable resin into an appropriate solvent and hardening it through exposure to ultraviolet rays.

Examples of usable ultraviolet curable resins include acrylate resins such as urethane acrylates, epoxy acrylates, and polyester acrylates.

Each of these materials may be used alone or in combination with one or more of the other materials, and may be formed into not only a single-layer film but also multilayer films.

Like the recording layer, the protective layer may be formed by coating such as spin coating or casting, sputtering, or CVD, of which spin coating is preferable.

The film thickness of the protective layer is generally 0.1 µm to 100 µm, but is preferably 3 µm to 30 µm according to the present invention.

Further, another substrate may be stuck to the reflective layer or the light transmission layer. Further, two optical recording media may be stuck together with the reflective layer of one of the optical recording media and the light transmission layer of the other one of the optical recording media internally facing toward each other.

An ultraviolet curable resin layer or an inorganic material layer may be formed on the mirror surface side of the substrate for surface protection or prevention of adhesion of foreign material such as dust.

It is desirable to form the light transmission layer or cover layer in the case of employing a high NA (numerical aperture) lens for higher recording density. For example, if the lens has a higher NA, it is desirable to reduce the thickness of part of the optical recording medium through which reproduction light passes. This is because with an increase in the NA, the allowance of the aberration caused by the angle of a shift of the disk (medium) surface from its perpendicularity with respect the optical axis of an optical pickup (a so-called tilt angle, which is proportional to the square of the product of the reciprocal of the wavelength of a light source and the NA of the objective lens) is reduced and this tilt angle is susceptible to the aberration due to the thickness of the substrate. Accordingly, the thickness of the substrate is reduced so as to reduce the effect of the aberration on the tilt angle as much as possible.

Therefore, for example, an optical recording medium is provided in which unevenness is formed on a substrate so as to serve as a recording layer, a reflective layer is provided on the recording layer, and a light transmission layer (cover layer) that transmits light is further provided on the reflective layer, so that information is reproduced from the recording layer by exposure to reproduction light through the cover layer; and an optical recording medium is provided in which a reflective layer is provided on a substrate, a recording layer is provided on the reflective layer, and a light transmission layer (cover layer) having a light transmitting characteristic is further provided on the recording layer, so that information is reproduced from the recording layer by exposure to reproduction light through the cover layer (the Blue-ray standard).

Thereby, it is possible to accommodate an increase in the NA of the objective lens by reducing the thickness of the light transmission layer. That is, by providing a thin light transmission layer and performing recording and reproduction from the side of this light transmission layer, it is possible to further increase recording density.

Such a light transmission layer is commonly formed of a polycarbonate sheet or ultraviolet curable resin.

Further, the light transmission layer according to the present invention may include a layer for adhering or bonding the light transmission layer.

Thus, according to one or more embodiments of the present invention, it is possible to provide a WORM optical recording medium having a recording layer containing a metal or metalloid as a principal component, the WORM optical recording medium showing good recording and reproduction characteristics with laser light of a blue wavelength region (350 nm to 500 nm), in particular, of 405 nm or in the vicinity of 405 nm, enabling high density recording, and having higher recording sensitivity than conventionally.

A more detailed description is given below, with reference to the accompanying drawings, of the present invention based on examples and comparative examples. The present invention, however, is not limited to those examples (embodiments). Further, by way of example, laser light of a 405 nm wavelength was used in the following examples. However, according to the recording layer of the present invention, recording and reproduction are performable in the same manner in a wavelength range of 350 nm to 500 nm because the complex index of refraction shows normal dispersion and does not change suddenly in the 350 nm to 500 nm wavelength range. That is, when the recording or reproduction wavelength changes within the 350 nm to 500 nm wavelength range, the reflectance or recording sensitivity of the WORM optical recording medium changes but no change is caused in the recording principle. Therefore, the same recording and reproduction are performable.

EXAMPLES 1 THROUGH 7

A reflective layer of a silver alloy (40 nm in film thickness), an upper protective layer (13 nm to 20 nm in film thickness), a recording layer (7 nm to 10 nm in film thickness), and a lower protective layer (40 nm to 60 nm in film thickness) were successively stacked by sputtering on a polycarbonate support substrate of 1.1 mm in thickness and 120 mm in diameter having guide grooves (20 nm in groove depth, with a track pitch of 0.32 µm, and 0.155 µm in average groove width). The upper protective layer, the recording layer, and the lower protective layer were formed using corresponding sputtering targets shown in TABLE 1 below, and the reflective layer was formed using a sputtering target of AgBi (Bi: 1.0 wt %). The sputtering was performed with a sputtering device (DVD Sprinter of Oerlikon) using Ar as a sputtering gas, whose flow rate was set at 30 sccm.

Next, a cover layer of ultraviolet curable resin (a product of Mitsubishi Rayon Co., Ltd.) having a thickness of 0.1 mm was formed on the lower protective layer by spin coating, thereby obtaining a WORM optical recording medium.

The film thicknesses of the upper protective layer, the recording layer, and the lower protective layer were subjected to fine adjustments within the above-described corresponding film thickness ranges so that the WORM optical recording medium had a reflectance of 16%.

The material of each layer (except the reflective layer and the cover layer) and the evaluation result of each of the WORM optical recording media of Examples 1-7 and Comparative Examples 1 and 2 are shown in TABLE 1 below.

The column of "Presence or Absence of Specific Adjacent Layer Element Dispersion Region in Recording Layer" shows the results of measurements performed according to either method (A) or (B) described below. In the column, a circle indicates that the ratio of a constituent element of a specific one of the layers adjacent to the recording layer (a specific adjacent layer) at the center of the recording layer determined by the interfaces with its adjacent layers is more than or equal to 5 at % of the elements of the recording layer and a cross indicates that the ratio of the constituent element of the specific adjacent layer at the center of the recording layer is less than 5 at % of the elements of the recording layer when the positions at which the number of atoms of the metal(s) or metalloid(s) contained in the recording layer is reduced to the half of its maximum value in the recording layer are defined as the interfaces of the recording layer with its adjacent layers. The same applies to TABLES 2 through 4. Alternatively, formation of a specific adjacent layer element dispersion region in the recording layer may be determined based on whether the region where the constituent element of a compound of the specific adjacent layer is dispersed in the recording layer reaches as deep as at least two thirds of the depth of the recording layer from its surface on the specific adjacent layer side. It may be determined that a specific adjacent layer element dispersion region is formed in the recording layer if the region where the constituent element of a compound of the specific adjacent layer is dispersed in the recording layer reaches as deep as at least two thirds of the depth of the recording layer from its surface on the specific adjacent layer side.

(A) Quantitative analysis of the composition distribution of a sample in its film thickness directions is conducted by RBS, the sample having an upper protective layer, a recording layer, and a specific adjacent layer (lower protective layer) successively formed on a carbon substrate using the sputtering targets shown in TABLE 1.

The upper protective layer between the carbon substrate and the recording layer may be omitted (may not be formed). Further, it is preferable to form a thin film to be analyzed on the carbon substrate in order to increase the accuracy of analysis by RBS.

(B) Quantitative analysis of the composition of a recording layer in its film thickness directions is conducted by XPS (X-ray Photoelectron Spectroscopy) with respect to a sample having a reflective layer, an upper protective layer, the recording layer, and a specific adjacent layer (lower protective layer) successively formed on a polycarbonate support substrate using the sputtering targets shown in TABLE 1 for the upper protective layer, the recording layer, and the specific adjacent layer.

A more detailed description is given, based on specific examples, of determination as to the presence or absence of a specific adjacent layer element diffusion region in the recording layer.

FIG. 1 is a graph showing the results of XPS quantitative analysis of a composition in the film thickness directions with respect to the WORM optical recording medium prepared in Example 7. The maximum number of atoms of Bi that is a metalloid contained in the recording layer (a metal or metalloid forming an oxide that is the principal component of the recording layer) is indicated by straight line d, and the number of atoms that is the half of this maximum number of atoms is indicated by straight line e. Further, the straight lines (parallel to the vertical axis) that pass through the points at which straight line e and the curve indicating the number of atoms of Bi cross each other, that is, straight line a and straight line b, are defined as the interfaces of the recording layer with its adjacent layers. Further, based on this definition, the center line between straight line a and straight line b, that is, straight line c, is defined as the center of the recording layer. The analysis was performed, performing etching from the lower protective layer side with Ar ions. The horizontal axis of FIG. 1 represents etching time, which corresponds to film thickness, and the vertical axis of FIG. 1 represents the ratio of the number of atoms (atom number ratio) (at %). The analytical conditions are as follows.

[XPS Measurement Conditions]
Measurement Device: AXIS-ULTRA of Kratos Analytical
Light Source: Monochromatized Al—Kα light source (hν=1486.4 eV)
Pass Energy: 80 eV
Energy Step: 0.5 eV
Neutralizer Gun: Used FIG. 1 shows that the Si element in the material of the lower protective layer (specific adjacent layer) of $Si_3N_4$ is more than or equal to 5 at % (approximately 16 at %) at the center of the recording layer. Further, the Si element in the material of the lower protective layer of $Si_3N_4$ is present in the recording layer beyond the interface (straight line a) with the recording layer, so as to be present beyond the center of the recording layer (straight line c) to reach the side of the upper protective layer, which is the adjacent layer on the side opposite to the specific adjacent layer. Thus, formation of a specific adjacent layer element dispersion region can be clearly confirmed. Further, it is also clearly shown that the Si/N ratio, which is substantially constant in the lower protective layer, is different in the recording layer. On the other hand, the Zn element in the material of the upper protective layer $ZnS.SiO_2$ is less than 5 at % at the center of the recording layer. This shows that the material of the upper protective layer is prevented from forming a specific adjacent layer element diffusion region in the recording layer because the upper protective layer is formed prior to the recording layer in the order of film formation.

Figure 2:
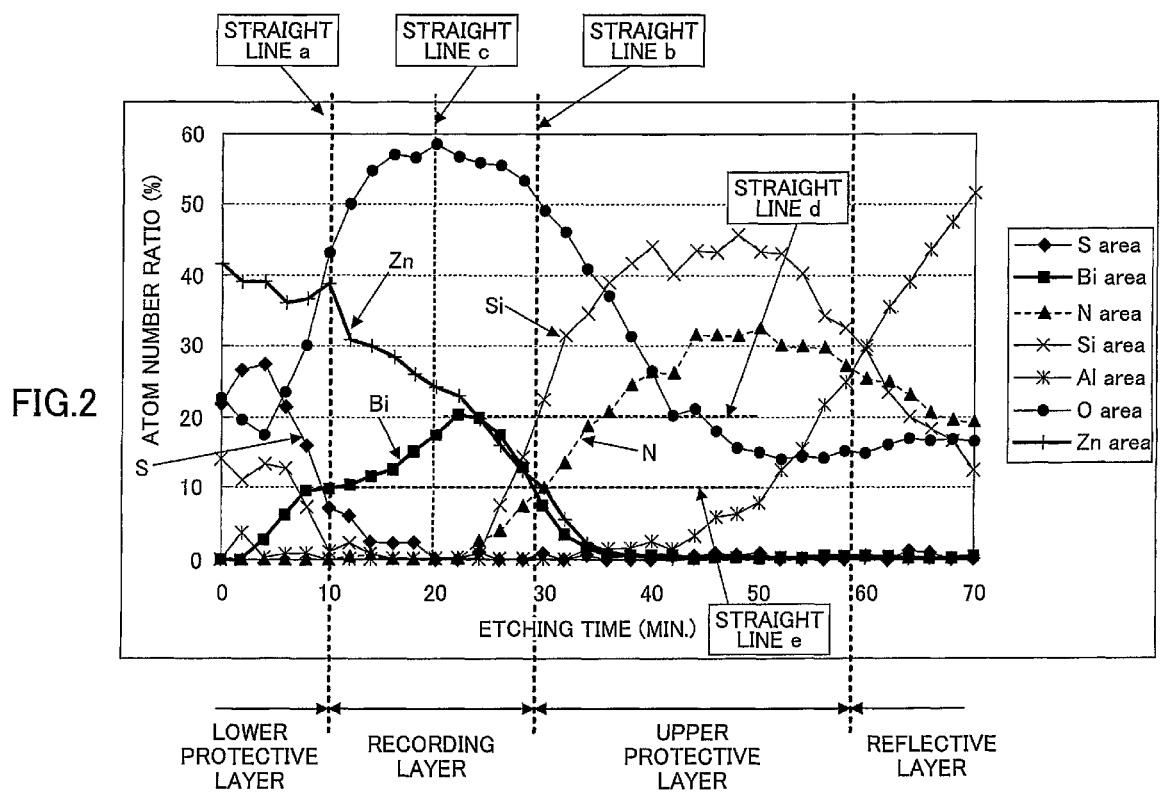
FIG. 2 is a graph showing the results of XPS quantitative analysis of a composition in the film thickness directions with respect to a WORM optical recording medium prepared in Example 6 according to the present invention.

As another example, FIG. 2 shows the results of XPS quantitative analysis of a composition in the film thickness directions performed in the same manner as in the case of FIG. 1 with respect to the WORM optical recording medium prepared in Example 6. The maximum number of atoms of Bi that is a metalloid contained in the recording layer (a metal or metalloid forming an oxide that is the principal component of the recording layer) is indicated by straight line d, and the number of atoms that is the half of this maximum number of atoms is indicated by straight line e. Further, the straight lines (parallel to the vertical axis) that pass through the points at which straight line e and the curve indicating the number of atoms of Bi cross each other, that is, straight line a and straight line b, are defined as the interfaces of the recording layer with its adjacent layers. Further, based on this definition, the center line between straight line a and straight line b, that is, straight line c, is defined as the center of the recording layer. The analytical method and the vertical and horizontal axes are the same as in the case of FIG. 1.

FIG. 2 shows that the Zn element in the material of the lower protective layer (specific adjacent layer) of $ZnS.SiO_2$ is more than or equal to 5 at % (approximately 25 at %) at the center of the recording layer. Further, the Zn element in the material of the lower protective layer of $ZnS.SiO_2$ is present in the recording layer beyond the interface (straight line a) with the recording layer, so as to be present beyond the center of the recording layer (straight line c) to reach the side of the upper protective layer, which is the adjacent layer on the side opposite to the specific adjacent layer. Thus, formation of a specific adjacent layer element dispersion region can be clearly confirmed. Further, it is also clearly shown that the Zn/S ratio, which is substantially constant in the lower protective layer, is different in the recording layer. On the other hand, the Si element in the material of the upper protective layer $Si_3N_4$ is less than 5 at % at the center of the recording layer. This shows that the material of the upper protective layer is prevented from forming a specific adjacent layer element diffusion region in the recording layer because the upper protective layer is formed prior to the recording layer in the order of film formation.

In TABLE 1, Recording Sensitivity shows optimum recording power at the time of performing recording compliant with the BD-R standard (System Description Blu-ray Disc Recordable Format Part 1 Basic Format Specifications) on the WORM optical recording medium of each of the examples and comparative examples at a recording rate of 19.67 m/s (4× recording) using an optical disk evaluation unit ODU-1000 of Pulstec Industrial Co., Ltd. (wavelength: 405 nm, NA: 0.85).

The jitter at the time of recording with the recording sensitivity shown in TABLE 1 was less than or equal to 7.0% (recording quality satisfying the BD-R standard) in each of Examples 1 to 7.

Thus, it has been determined that according to the WORM optical recording medium of the present invention, good quality recording that satisfies the BD-R standard can be performed with high sensitivity.

Further, as a result of quantitative analysis of the composition of the recording layer in its film thickness directions by XPS, it has been found that bismuth exists substantially as an oxide in Example 1 and that bismuth exists as an oxide and metallic bismuth in Example 2.

The same sputtering target was used in Example 1 and Example 2, but oxygen was introduced during sputtering in Example 1. As a result, while oxygen deficiency of $Bi_2O_3$ occurs in the recording layer formed by sputtering in Examples 2, 6, and 7, oxygen deficiency of $Bi_2O_3$ is very little in the recording layer of Example 1.

It is principally concluded from the above-described analysis results that:

Recording layer of Example 1 satisfies Configuration 1 according to the present invention.

Recording layers of Examples 2, 6, and 7 satisfy Configuration 2 according to the present invention.

Recording layer of Example 3 satisfies Configuration 3 according to the present invention.

Recording layer of Example 4 satisfies Configuration 4 according to the present invention.

Recording layer of Example 5 satisfies Configuration 5 according to the present invention.

Further, it has been found that the complex index of refraction of the recording layer satisfies the real part being more than or equal to 2.20 and the imaginary part being more than or equal to 0.30 in each of Examples 1 through 7.

By comparison with the results of Comparative Examples 1 and 2 described below, it has been clarified that formation of a specific adjacent layer element dispersion region in the recording layer significantly improves recording sensitivity, so that it has been determined that the present invention is extremely effective.

COMPARATIVE EXAMPLES 1 AND 2

WORM optical recording media were prepared and evaluated in the same manner as in Examples 1 through 7 except that the sputtering targets were changed to those shown in the column for Comparative Examples 1 and 2 in TABLE 1 and that the sputtering device was changed to CFS-8EP of Shibaura Eletec Corporation.

As a result, it has been found that the recording sensitivity is worse in the WORM optical recording media of Comparative Examples 1 and 2 than in Examples 1 through 7. The cause of this degradation of recording sensitivity was investigated.

Figure 3:
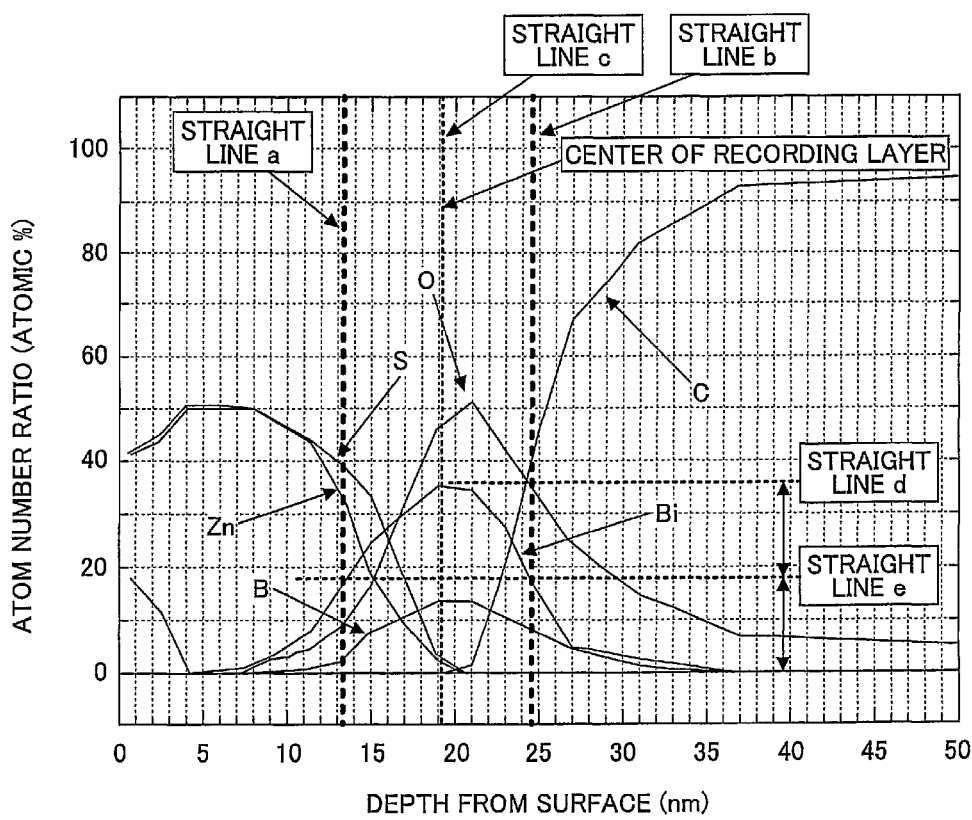
FIG. 3 is a graph showing the results of quantitative analysis of a composition of a sample in its film thickness directions by RBS, the sample being formed by successively stacking a recording layer and a lower protective layer (specific adjacent layer) on a carbon substrate using the same sputtering targets as Comparative Example 1, according to the present invention.

A sample was formed by successively stacking a recording layer and a lower protective layer (specific adjacent layer) on a carbon substrate using the same sputtering targets as Comparative Example 1. FIG. 3 shows the results of quantitative analysis of the composition of the sample in its film thickness directions by RBS. The horizontal axis of FIG. 3 represents the depth from the surface (corresponding to film thickness) and the vertical axis of FIG. 3 represents the atom number ratio (at %). Further, the definition of the positions of the interfaces between the recording layer and its adjacent layers and the definition of the position of the center of the recording layer in FIG. 3 are the same as described above with reference to FIGS. 1 and 2.

FIG. 3 shows that the Zn element in the material of the lower protective layer (specific adjacent layer) of ZnS is less than 5 at % at the center of the recording layer so that no specific adjacent layer element dispersion region is formed in the recording layer. Further, FIG. 3 also shows that the Zn element in the material of the lower protective layer of ZnS does not reach as deep as two thirds of the depth of the recording layer from the interface with the lower protective layer. Thus, it is possible to confirm in this respect also that the specific adjacent layer element dispersion region defined in the present invention is not formed in the recording layer. The recording sensitivity is clearly worse in Comparative Example 1 than in Examples 1 through 7. It is considered that the worsening of sensitivity is due to the absence of a specific adjacent layer element dispersion region in the recording layer.

Figure 4:
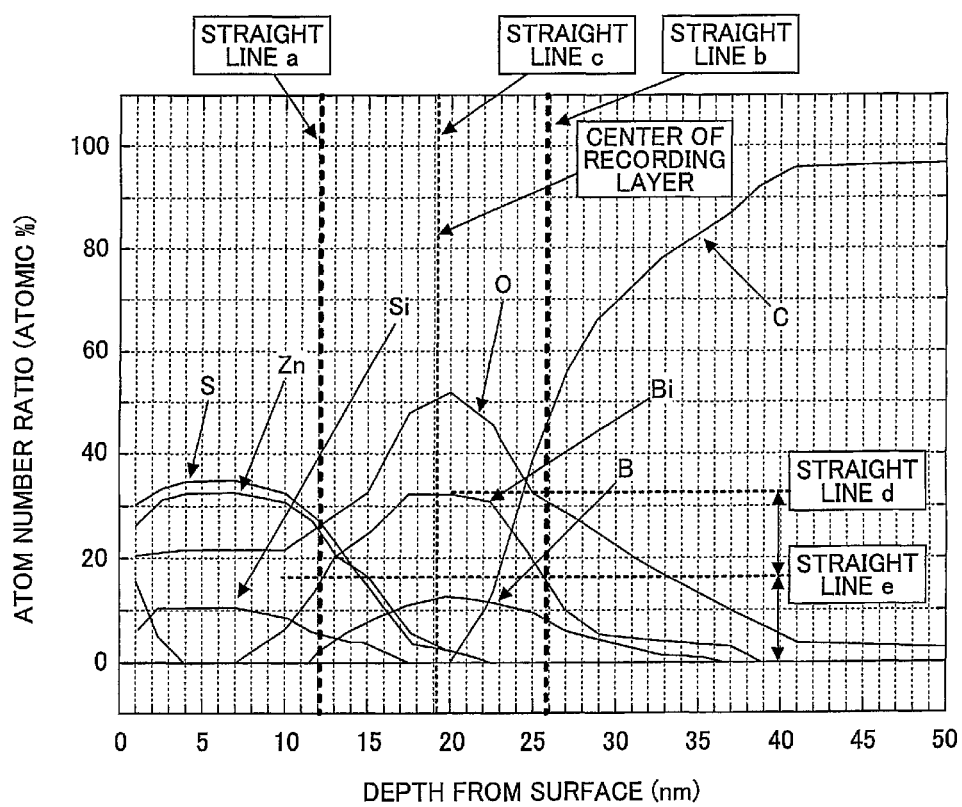
FIG. 4 is a graph showing the results of quantitative analysis of a composition of a sample in its film thickness directions by RBS, the sample being formed by successively stacking a recording layer and a lower protective layer (specific adjacent layer) on a carbon substrate using the same sputtering targets as Comparative Example 2, according to the present invention.

In the same manner as in the case of FIG. 3, a sample was formed by successively stacking a recording layer and a lower protective layer (specific adjacent layer) on a carbon substrate using the same sputtering targets as Comparative Example 2. FIG. 4 shows the results of quantitative analysis of the composition of the sample in its film thickness directions by RBS. The definitions of the vertical axis, the horizontal axis, the positions of the interface between the recording layer and its adjacent layers, and the position of the center of the recording layer are the same as described above with reference to FIGS. 1 and 2.

FIG. 4 shows that the Zn element in the material of the lower protective layer (specific adjacent layer) of $ZnS.SiO_2$ is less than 5 at % at the center of the recording layer so that no specific adjacent layer element dispersion region is formed in the recording layer. Further, FIG. 4 also shows that the Zn element in the material of the lower protective layer of ZnS—$SiO_2$ does not reach as deep as two thirds of the depth of the recording layer from the interface with the lower protective layer. Thus, it is possible to confirm in this respect also that the specific adjacent layer element dispersion region defined in the present invention is not formed in the recording layer. The recording sensitivity is clearly worse in Comparative Example 2 than in Examples 1 through 7. It is considered that the worsening of sensitivity is due to the absence of a specific adjacent layer element dispersion region in the recording layer.

Comparing Example 2 with Comparative Example 2, although the same material is used for the lower protective layer, there is a difference in the presence or absence of the specific adjacent layer element dispersion region in the recording layer. It is considered that this is due to a difference in the sputtering device that has formed the lower protective layer (a difference in the sputtering condition) and a difference in the lot of the sputtering target.

In particular, if there is a difference in the sputtering condition, it is very often the case that there is a shift in the composition of the formed film even if the difference seems little (for example, even if a sputtering device of the same type is used).

Further, there may be a difference in the presence or absence of the specific adjacent layer element dispersion region even when a sputtering target of the nominally same composition is used. It is considered that this is because there are slight differences in conditions of preparation of the sputtering target, such as starting materials, a mixture method, and a sintering method.

Accordingly, it may be necessary to make fine adjustments to sputtering conditions or to sort out the sputtering target in the case of improving recording sensitivity by the present invention.

Further, an organic protective layer of ultraviolet curable resin (Nopcocure 134 of SAN NOPCO LIMITED) having a thickness of 5 µm was formed on the reflective layer by spin

TABLE 1

| | SPUTTERING TARGET COMPOSITION FOR UPPER PROTECTIVE LAYER | SPUTTERING TARGET COMPOSITION FOR RECORDING LAYER ($\alpha$) | MIXTURE RATIO OF $\alpha$ (MOLAR RATIO) |
|---|---|---|---|
| EXAMPLE 1 | ZnS—SiO$_2$ (80:20 mol %) | Bi$_2$O$_3$/B$_2$O$_3$ (OXYGEN INTRODUCED) | 2:1 |
| EXAMPLE 2 | ZnS—SiO$_2$ (80:20 mol %) | Bi$_2$O$_3$/B$_2$O$_3$ | 2:1 |
| EXAMPLE 3 | ZnS—SiO$_2$ (80:20 mol %) | Bi$_2$O$_3$/Cu | 1:1 |
| EXAMPLE 4 | ZnS—SiO$_2$ (80:20 mol %) | Bi$_2$O$_3$/B$_2$O$_3$/B | 54.7:19.0:26.3 |
| EXAMPLE 5 | ZnS—SiO$_2$ (80:20 mol %) | Bi/Bi$_2$O$_3$/B$_2$O$_3$/B | 5.0:49.7:19.0:26.3 |
| EXAMPLE 6 | Si$_3$N$_4$ | Bi$_2$O$_3$/B$_2$O$_3$ | 2:1 |
| EXAMPLE 7 | ZnS—SiO$_2$ (80:20 mol %) | Bi$_2$O$_3$/B$_2$O$_3$ | 2:1 |
| COMPARATIVE EXAMPLE 1 | ZnS—SiO$_2$ (80:20 mol %) | Bi$_2$O$_3$/B$_2$O$_3$ | 2:1 |
| COMPARATIVE EXAMPLE 2 | ZnS—SiO$_2$ (80:20 mol %) | Bi$_2$O$_3$/B$_2$O$_3$ | 2:1 |

| | SPUTTERING TARGET COMPOSITION FOR SPECIFIC ADJACENT LAYER (LOWER PROTECTIVE LAYER) | PRESENCE OR ABSENCE OF SPECIFIC ADJACENT LAYER ELEMENT DISPERSION REGION IN RECORDING LAYER | RECORDING SENSITIVITY (mW) |
|---|---|---|---|
| EXAMPLE 1 | ZnS—SiO$_2$ (80:20 mol %) | ○ | 9.8 |
| EXAMPLE 2 | ZnS—SiO$_2$ (80:20 mol %) | ○ | 8.3 |
| EXAMPLE 3 | ZnS—SiO$_2$ (80:20 mol %) | ○ | 7.5 |
| EXAMPLE 4 | ZnS—SiO$_2$ (80:20 mol %) | ○ | 7.4 |
| EXAMPLE 5 | ZnS—SiO$_2$ (80:20 mol %) | ○ | 7.4 |
| EXAMPLE 6 | ZnS—SiO$_2$ (80:20 mol %) | ○ | 9.0 |
| EXAMPLE 7 | Si$_3$N$_4$ | ○ | 8.9 |
| COMPARATIVE EXAMPLE 1 | ZnS | x | 11.0 |
| COMPARATIVE EXAMPLE 2 | ZnS—SiO$_2$ (80:20 mol %) | x | 11.5 |

EXAMPLES 8 THROUGH 21

A lower protective layer (40 nm to 60 nm in film thickness) of ZnS.SiO$_2$ (80:20 mol %), a recording layer (7 nm to 10 nm in film thickness), and an upper protective layer (13 nm to 20 nm in film thickness) were successively stacked by sputtering on a polycarbonate support substrate having guide grooves (28 nm in groove depth, with a track pitch of 0.40 µm, and 0.20 µm in average groove width). The lower protective layer, the recording layer, and the upper protective layer were formed using corresponding sputtering targets shown in TABLE 2 below.

Next, a reflective layer (60 nm in film thickness) of AgBi (Bi: 1.0 wt %) was formed on the upper protective layer by sputtering.

The sputtering was performed with a sputtering device (DVD Sprinter of Oerlikon) using Ar as a sputtering gas, whose flow rate was set at 30 sccm.

coating, thereby obtaining a WORM optical recording medium according to the present invention.

The film thicknesses of the lower protective layer, the recording layer, and the upper protective layer were subjected to fine adjustments within the above-described corresponding film thickness ranges so that the WORM optical recording medium had a reflectance of 16%.

The material of each layer (except the reflective layer and the organic protective layer) and the evaluation result of each of the WORM optical recording media of Examples 8-21 and Comparative Examples 3-6 are shown in TABLE 2 below. The meanings of the items except Recording Sensitivity are the same as those of TABLE 1. In TABLE 2, Recording Sensitivity shows optimum recording power at the time of performing recording compliant with the HD DVD-R standard (DVD Specifications for High Density Recordable Disc [HD DVD-R] Version 1.0) on the WORM optical recording medium of each of the examples and comparative examples at a recording rate of 6.61 m/s using an optical disk evaluation unit ODU-1000 of Pulstec Industrial Co., Ltd. (wavelength: 405 nm, NA: 0.65).

Further, the PRSNR at the time of recording with the recording sensitivity shown in TABLE 2 was more than or equal to 15 (recording quality satisfying the HD DVD-R standard) in each of Examples 8 to 21.

Thus, it has been determined that according to the WORM optical recording medium of the present invention, good quality recording that satisfies the HD DVD-R standard can be performed with high sensitivity.

Further, in Examples 8 through 21 also, investigation by XPS was conducted the same as in FIGS. 1 and 2 so as to find that a specific adjacent layer element dispersion region is formed in each recording layer.

Further, quantitative analysis was conducted of the composition of the recording layer in its film thickness direction by XPS so as to find that bismuth exists substantially as an oxide in Example 8 and that bismuth exists as an oxide and metallic bismuth in Example 9.

The same sputtering target was used in Example 8 and Example 9, but oxygen was introduced during sputtering in Example 8. As a result, while oxygen deficiency of $Bi_2O_3$ occurs in the recording layer formed by sputtering in Example 9, oxygen deficiency of $Bi_2O_3$ is very little in the recording layer of Example 8.

Likewise, quantitative analysis was conducted of the composition of the recording layer in its film thickness direction by XPS so as to find that antimony exists as an oxide and metalloid antimony in Example 20 and that tellurium exists as an oxide and metalloid tellurium in Example 21.

It is concluded from the above-described analysis results that:

Recording layer of Example 8 satisfies Configuration 1 according to the present invention.

Recording layers of Examples 9, 20, and 21 satisfy Configuration 2 according to the present invention.

Recording layer of Example 10 satisfies Configuration 3 according to the present invention.

Recording layers of Examples 11 and 13 through 19 satisfy Configuration 4 according to the present invention.

Recording layer of Example 12 satisfies Configuration 5 according to the present invention.

Further, it has been found that the complex index of refraction of the recording layer satisfies the real part being more than or equal to 2.20 and the imaginary part being more than or equal to 0.30 in each of Examples 8 through 21.

By comparison with the results of Comparative Examples 3 through 6 described below, it has been clarified that formation of a specific adjacent layer element dispersion region in the recording layer significantly improves recording sensitivity, so that it has been determined that the present invention is extremely effective.

COMPARATIVE EXAMPLES 3 THROUGH 6

WORM optical recording media were prepared and evaluated in the same manner as in Examples 8 through 21 except that the sputtering targets were changed to those shown in the column for Comparative Examples 3 through 6 in TABLE 2 and that the sputtering device was changed to CFS-8EP of Shibaura Eletec Corporation.

The results are shown in TABLE 2. It has been found that the recording sensitivity is worse in Comparative Examples 3 through 6 than in Examples 8 through 21.

Therefore, the cause of the degradation of recording sensitivity was investigated using RBS the same as in the cases of Comparative Examples 1 and 2. As a result, it has been found that no specific adjacent layer element dispersion region is formed in the recording layer in any of Examples 3 through 6, either. That is, it is because there is no specific adjacent layer element dispersion region in the recording layer that the recording sensitivity is worse in Comparative Examples 3 through 6 than in Examples 8 through 21.

Further, comparing Example 9 with Comparative Example 4 and comparing Example 13 with Comparative Example 3, there is a difference in the presence or absence of the specific adjacent layer element dispersion region in the recording layer although the same material is used for the upper protective layer. The cause of this is considered to be the same as that described in Comparative Examples 1 and 2.

TABLE 2

| | SPUTTERING TARGET COMPOSITION FOR RECORDING LAYER ($\alpha$) | MIXTURE RATIO OF $\alpha$ (MOLAR RATIO) |
|---|---|---|
| EXAMPLE 8 | $Bi_2O_3/B_2O_3$ (OXYGEN INTRODUCED) | 2:1 |
| EXAMPLE 9 | $Bi_2O_3/B_2O_3$ | 2:1 |
| EXAMPLE 10 | $Bi_2O_3/Cu$ | 1:1 |
| EXAMPLE 11 | $Bi_2O_3/B_2O_3/B$ | 54.7:19.0:26.3 |
| EXAMPLE 12 | $Bi/Bi_2O_3/B_2O_3/B$ | 5.0:49.7:19.0:26.3 |
| EXAMPLE 13 | $Bi_2O_3/B_2O_3/B$ | 54.7:19.0:26.3 |
| EXAMPLE 14 | $Bi_2O_3/B_2O_3/B$ | 54.7:19.0:26.3 |
| EXAMPLE 15 | $Bi_2O_3/B_2O_3/B$ | 54.7:19.0:26.3 |
| EXAMPLE 16 | $Bi_2O_3/B_2O_3/B$ | 54.7:19.0:26.3 |
| EXAMPLE 17 | $Bi_2O_3/B_2O_3/B$ | 54.7:19.0:26.3 |
| EXAMPLE 18 | $Bi_2O_3/B_2O_3/B$ | 54.7:19.0:26.3 |
| EXAMPLE 19 | $Bi_2O_3/B_2O_3/B$ | 54.7:19.0:26.3 |
| EXAMPLE 20 | $Sb_2O_5/B_2O_3$ | 2:1 |
| EXAMPLE 21 | $TeO_2/B_2O_3$ | 4:1 |
| COMPARATIVE EXAMPLE 3 | $Bi_2O_3/B_2O_3$ | 3:1 |
| COMPARATIVE EXAMPLE 4 | $Bi_2O_3/B_2O_3$ | 3:1 |
| COMPARATIVE EXAMPLE 5 | $Bi_2O_3/B_2O_3$ | 3:1 |

TABLE 2-continued

| | SPUTTERING TARGET COMPOSITION FOR SPECIFIC ADJACENT LAYER (UPPER PROTECTIVE LAYER) | | |
|---|---|---|---|
| COMPARATIVE EXAMPLE 6 | $Bi_2O_3/B_2O_3$ | 3:1 | |

| | SPUTTERING TARGET COMPOSITION FOR SPECIFIC ADJACENT LAYER (UPPER PROTECTIVE LAYER) | PRESENCE OR ABSENCE OF SPECIFIC ADJACENT LAYER ELEMENT DISPERSION REGION IN RECORDING LAYER | RECORDING SENSITIVITY (mW) |
|---|---|---|---|
| EXAMPLE 8 | $ZnS$—$SiO_2$ (80:20 mol %) | ○ | 9.5 |
| EXAMPLE 9 | $ZnS$—$SiO_2$ (80:20 mol %) | ○ | 8.5 |
| EXAMPLE 10 | $ZnS$—$SiO_2$ (80:20 mol %) | ○ | 7.0 |
| EXAMPLE 11 | $ZnS$—$SiO_2$ (80:20 mol %) | ○ | 7.1 |
| EXAMPLE 12 | $ZnS$—$SiO_2$ (80:20 mol %) | ○ | 6.9 |
| EXAMPLE 13 | ZnS | ○ | 6.8 |
| EXAMPLE 14 | $Si_3N_4$ | ○ | 7.8 |
| EXAMPLE 15 | $TiO_2$—TiC (70:30 wt %) | ○ | 7.6 |
| EXAMPLE 16 | $MgF_2$ | ○ | 7.4 |
| EXAMPLE 17 | SrS | ○ | 6.7 |
| EXAMPLE 18 | CaS | ○ | 6.8 |
| EXAMPLE 19 | $Nb_2O_5$ | ○ | 7.8 |
| EXAMPLE 20 | $ZnS$—$SiO_2$ (80:20 mol %) | ○ | 8.4 |
| EXAMPLE 21 | $ZnS$—$SiO_2$ (80:20 mol %) | ○ | 8.6 |
| COMPARATIVE EXAMPLE 3 | ZnS | x | 10.8 |
| COMPARATIVE EXAMPLE 4 | $ZnS$—$SiO_2$ | x | 11.7 |
| COMPARATIVE EXAMPLE 5 | $SiO_2$ | x | 13.0 |
| COMPARATIVE EXAMPLE 6 | $Nb_2O_5$ | x | 12.8 |

EXAMPLES 22 AND 23, COMPARATIVE EXAMPLE 7

WORM optical recording media were prepared and evaluated in the same manner as in Examples 8 through 21 except that the sputtering targets were changed to those shown in TABLE 3 and that the flow rate of Ar was changed.

With Examples 22 and 23 and Comparative Example 7, the relationship between the flow rate of Ar at the time of formation of the recording layer and the recording sensitivity was investigated. The results were shown in TABLE 3. As the case of an Ar flow rate of 30 sccm, the results of Example 11 of TABLE 2 are transferred to TABLE 3.

The presence or absence of a specific adjacent layer element dispersion region in the recording layer was evaluated by XPS and RBS the same as in Examples 8 through 21.

As a result, it has been found that as the Ar flow rate decreases, a specific adjacent layer element dispersion region becomes less likely to be formed in the recording layer so that the recording sensitivity is reduced.

It is believed that these results show that an increase in the flow rate of a sputtering gas during formation of the recording layer causes the sputtering gas to be captured into the recording layer during the formation and causes larger particles to be ejected from the sputtering target so as to reduce the packing density of the formed recording layer, thereby making it more likely for the material of the upper protective layer (specific adjacent layer) to be buried into the recording layer.

Further, these results also show that an increase in the flow rate of a sputtering gas during formation of the recording layer is likely to cause the oxygen deficiency of a metal or metalloid oxide, which is the principal component of the recording layer material, so as to improve recording sensitivity.

TABLE 3

| | SPUTTERING TARGET COMPOSITION FOR RECORDING LAYER (α) | MIXTURE RATIO OF α (MOLAR RATIO) | Ar FLOW RATE AT TIME OF FORMATION OF RECORDING LAYER (sccm) |
|---|---|---|---|
| COMPARATIVE EXAMPLE 7 | $Bi_2O_3/B_2O_3$/B | 54.7:19.0:26.3 | 10 |
| EXAMPLE 22 | $Bi_2O_3/B_2O_3$/B | 54.7:19.0:26.3 | 15 |

TABLE 3-continued

| | | | |
|---|---|---|---|
| *EXAMPLE 11 | $Bi_2O_3/B_2O_3/B$ | 54.7:19.0:26.3 | 30 |
| EXAMPLE 23 | $Bi_2O_3/B_2O_3/B$ | 54.7:19.0:26.3 | 40 |

| | SPUTTERING TARGET COMPOSITION FOR SPECIFIC ADJACENT LAYER (UPPER PROTECTIVE LAYER) | PRESENCE OR ABSENCE OF SPECIFIC ADJACENT LAYER ELEMENT DISPERSION REGION IN RECORDING LAYER | RECORDING SENSITIVITY (mW) |
|---|---|---|---|
| COMPARATIVE EXAMPLE 7 | $ZnS$—$SiO_2$ (80:20 mol %) | x | 9.5 |
| EXAMPLE 22 | $ZnS$—$SiO_2$ (80:20 mol %) | ○ | 8.0 |
| *EXAMPLE 11 | $ZnS$—$SiO_2$ (80:20 mol %) | ○ | 7.1 |
| EXAMPLE 23 | $ZnS$—$SiO_2$ (80:20 mol %) | ○ | 6.7 |

EXAMPLES 24 THROUGH 28

WORM optical recording media were prepared and evaluated in the same manner as in Examples 8 through 21 except that the sputtering targets were changed to those shown in TABLE 4 and that a specific adjacent layer formed of the simple substance of at least one element M that reinforces a light absorbing function with respect to recording and reproduction laser light is provided between the recording layer and the upper protective layer. Examples 24 through 28 verify the effect of Configuration 12 of the present invention.

That is, according to the WORM optical recording media of Examples 8 through 23, the upper protective layer has both the function of causing a specific adjacent layer element dispersion region to be formed in the recording layer and the above-described function of heat insulation and reflectance control, while according to the layer structures of Examples 24 through 28, the above-described two functions are separately assigned to the specific adjacent layer and the upper protective layer, respectively.

That is, Examples 24 through 28 have the layer structure of support substrate/lower protective layer/recording layer/specific adjacent layer causing a specific adjacent layer element dispersion region in the recording layer/upper protective layer having the heat insulation and reflectance control function/reflective layer.

The specific adjacent layer was 2 nm to 4 nm in film thickness, and the film thicknesses of the lower protective layer, the recording layer, the specific adjacent layer, and the upper protective layer were subjected to fine adjustments so that the WORM optical recording medium had a reflectance of 14% through 18%.

The presence or absence of a specific adjacent layer element dispersion region in the recording layer was evaluated by XPS and RBS the same as in Examples 8 through 23.

As a result, it has been found that a specific adjacent layer element dispersion region was formed in the recording layer of each WORM optical recording medium, thereby significantly improving recording sensitivity.

TABLE 4

| | SPUTTERING TARGET COMPOSITION FOR RECORDING LAYER (α) | MIXTURE RATIO OF α (MOLAR RATIO) | SPUTTERING TARGET COMPOSITION FOR SPECIFIC ADJACENT LAYER |
|---|---|---|---|
| EXAMPLE 24 | $Bi_2O_3/B_2O_3$ | 2:1 | Ge |
| EXAMPLE 25 | $Bi_2O_3/B_2O_3$ | 2:1 | Cu |
| EXAMPLE 26 | $Bi_2O_3/B_2O_3$ | 2:1 | Pd |
| EXAMPLE 27 | $Bi_2O_3/B_2O_3$ | 2:1 | Zn |
| EXAMPLE 28 | $Bi_2O_3/B_2O_3$ | 2:1 | Mg |

| | SPUTTERING TARGET COMPOSITION FOR UPPER PROTECTIVE LAYER | PRESENCE OR ABSENCE OF SPECIFIC ADJACENT LAYER ELEMENT DISPERSION REGION IN RECORDING LAYER | RECORDING SENSITIVITY (mW) |
|---|---|---|---|
| EXAMPLE 24 | $ZnS$—$SiO_2$ (80:20 mol %) | ○ | 8.8 |
| EXAMPLE 25 | $ZnS$—$SiO_2$ (80:20 mol %) | ○ | 8.5 |
| EXAMPLE 26 | $ZnS$—$SiO_2$ (80:20 mol %) | ○ | 9.0 |
| EXAMPLE 27 | $ZnS$—$SiO_2$ (80:20 mol %) | ○ | 8.4 |
| EXAMPLE 28 | $ZnS$—$SiO_2$ (80:20 mol %) | ○ | 8.2 |

EXAMPLE 29

A reflective layer of an AlTi alloy (Ti: 1.0 wt %) having a film thickness of 35 nm, an upper protective layer of SiN having a film thickness of 10 nm, a recording layer of 16 nm in film thickness using $Bi_2O_3:B_2O_3=3:2$ (weight ratio) as a target, and a lower protective layer (specific adjacent layer) of ZnS—$SiO_2$ (80:20 mol %) having a film thickness of 8 nm were successively formed by sputtering on a polycarbonate support substrate of 1.1 mm in thickness and 120 mm in diameter having guide grooves (21 nm in groove depth, with a track pitch of 0.32 µm, and 0.155 µm in average groove width). The sputtering was performed with a sputtering device (DVD Sprinter of Oerlikon) using Ar as a sputtering gas, whose flow rate was set at 30 sccm.

Next, a cover layer of ultraviolet curable resin (a product of Mitsubishi Rayon Co., Ltd.) having a thickness of 0.1 mm was formed on the lower protective layer by spin coating, thereby obtaining a WORM optical recording medium.

Recording was performed on this WORM optical recording medium under conditions compliant with the BD-R disk standard, and its recording characteristics were evaluated using an optical disk evaluation unit ODU-1000 of Pulstec Industrial Co., Ltd. (wavelength: 405 nm, NA: 0.85). As a result, it has been found that the WORM optical recording medium has good recording and reproduction characteristics.

Figure 5:
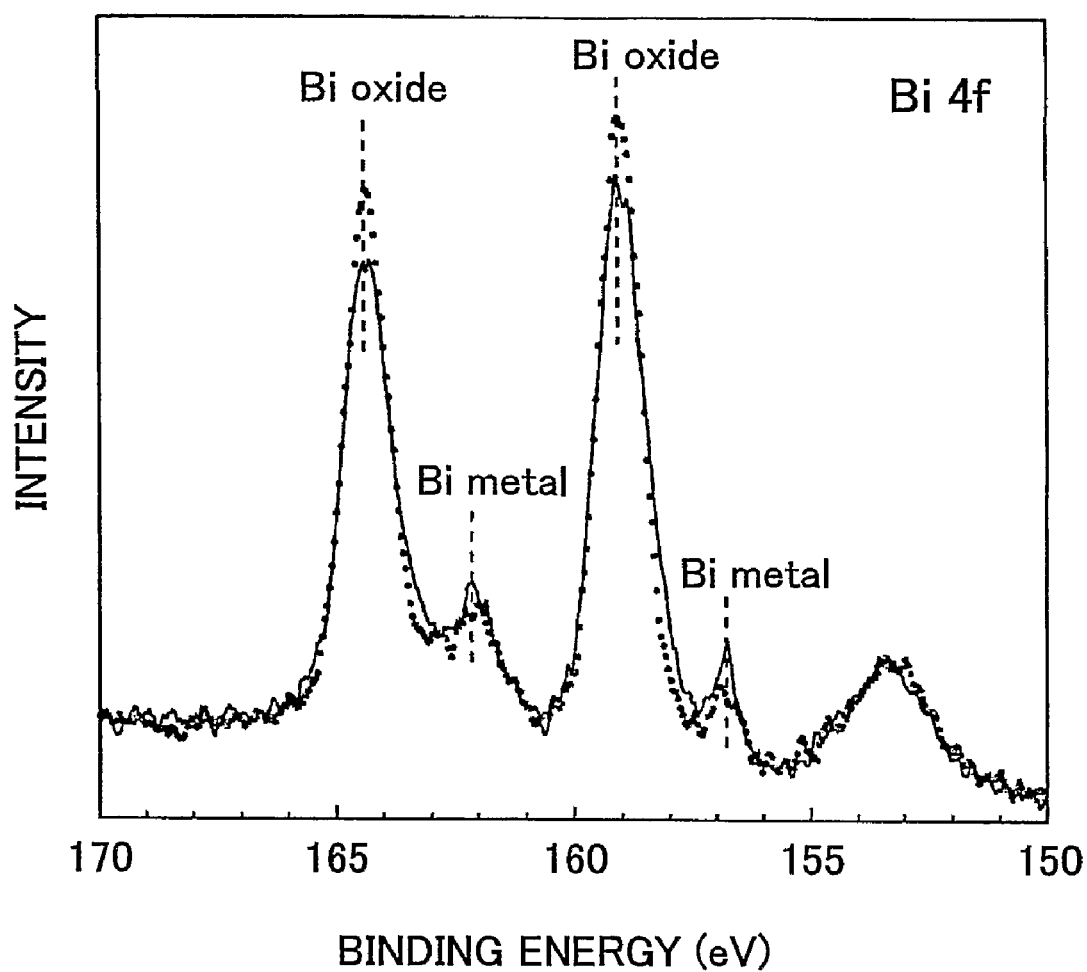
FIG. 5 is a graph showing the results of analysis of the recording mark part of Example 29 by XPS according to the present invention.

Next, in order to check the chemical state of a recording mark part, the cover layer was removed and analysis by XPS was conducted. The results are shown in FIG. 5. The analytical conditions are as follows.

[XPS Measurement Conditions]
Measurement Device: R-4000 of GAMMADATA-SCIENTA
Light Source: Synchrotron Radiation (SR) (hv=7935 eV) @SPring-8 BL47XU (Proposal Number 2006B1511)
Pass Energy: 200 eV
Energy Step: 0.05 eV
Neutralizer Gun: Used In FIG. 5, the solid line is the XPS spectrum of a recording mark part, and the dotted line is the XPS spectrum of an unrecorded region.

FIG. 5 shows that Bi in the recording film exists as an oxide and a slight metal. Further, it can be determined from a change in the intensity ratio of the Bi oxide peak and the Bi metal peak that the ratio of metallic Bi increases in the recording mark part compared with the unrecorded region. Further, recording of a recording mark does not change the position of binding energy at which the Bi oxide peak is detected. This shows that no chemical shift occurs in Bi so that there is no change in the oxidation state of Bi (there is no change in the valence of Bi).

In this example, SiN was used as the material of the upper protective layer, and it has been found that use of ZnS—$SiO_2$ as an alternative further increases recording characteristics and is preferable.

EXAMPLE 30

A lower protective layer of ZnS—$SiO_2$ (80: 20 mol %) having a film thickness of 60 nm, a recording layer of 16 nm in film thickness using $Bi_2O_3:B_2O_3=3:2$ (weight ratio) as a target, an upper protective layer (specific adjacent layer) of ZnS—$SiO_2$ (80:20 mol %) having a film thickness of 16 nm, and a reflective layer of an AlTi alloy (Ti: 1.0 wt %) having a film thickness of 30 nm were successively provided by sputtering on a polycarbonate support substrate of 0.6 mm in thickness and 120 mm in diameter having guide grooves (21 nm in groove depth and with a track pitch of 0.46 µm). Further, a cover layer of ultraviolet curable resin having a thickness of 0.5 mm was provided, thereby obtaining a WORM optical recording medium.

Recording was performed on this WORM optical recording medium under conditions compliant with the WORM HD DVD disk standard, and its recording characteristics were evaluated using an optical disk evaluation unit ODU-1000 of Pulstec Industrial Co., Ltd. (wavelength: 405 nm, NA: 0.65). As a result, it has been found that the WORM optical recording medium has good recording and reproduction characteristics.

Figure 6:
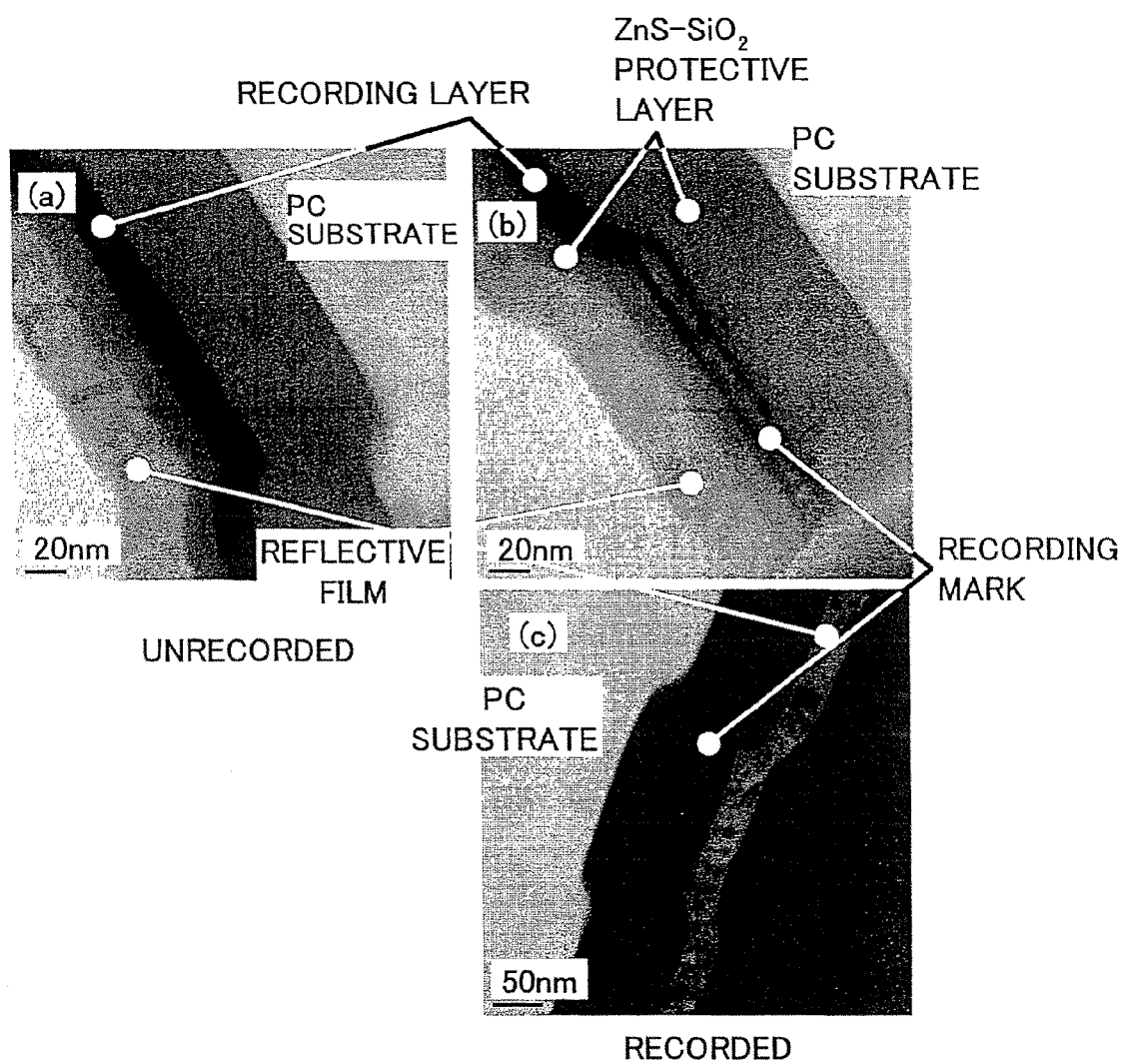
FIG. 6 shows the results of observation of a cross section of a recording layer of Example 30 by TEM, where (a) shows an unrecorded conditions and (b) and (c) show recorded conditions, according to the present invention.
Figure 7:
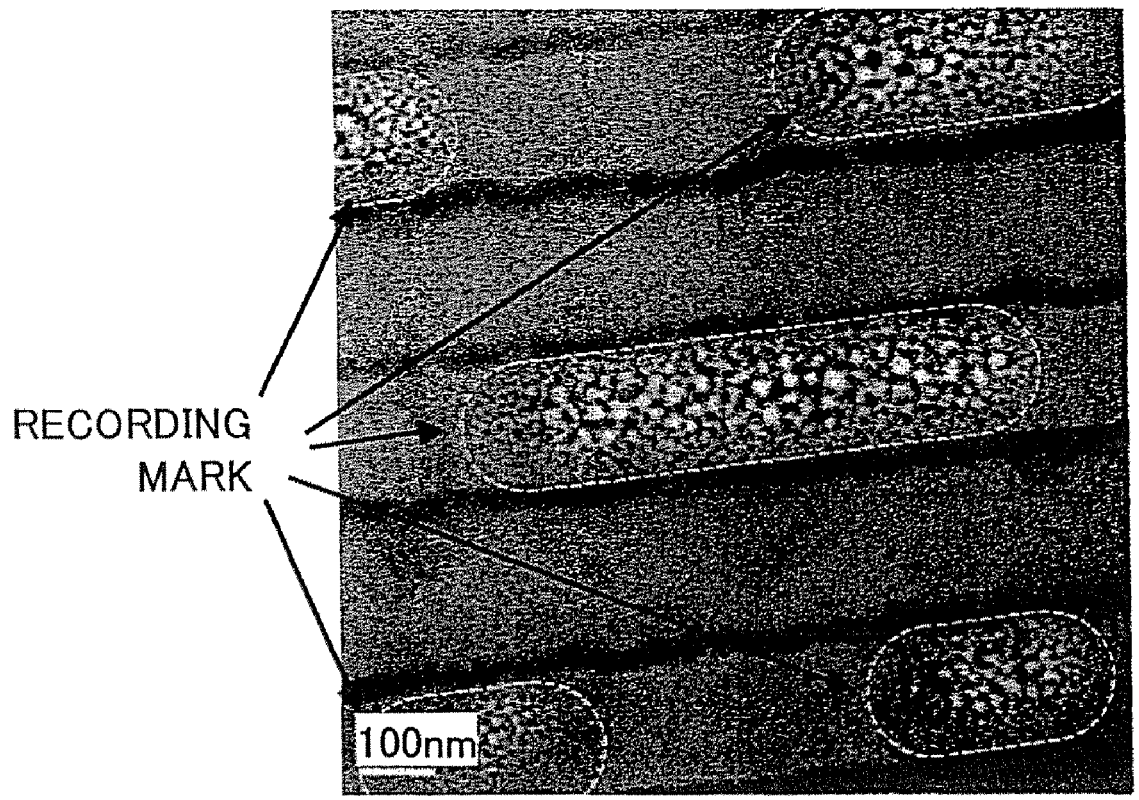
FIG. 7 shows the results of observation of a plane of the recording layer of Example 30 by TEM according to the present invention.

Next, TEM (Transmission Electron Microscope) analysis was conducted in order to check the planar and cross-sectional conditions of the recording layer. FIG. 6 shows the results of observation of a cross section of the recording layer by TEM. FIG. 7 shows the results of observation of a plane of the recording layer by TEM. The analytical conditions are as follows.

[TEM Measurement Conditions]
Measurement Device: JEF-2100F (a product of JEOL Ltd.)
Acceleration Voltage: 200 kV
Aperture Diameter: 1 (CL), 2 (OL)
Spot Size: 1

In FIG. 6, (b) and (c) show examples of recorded conditions. These show that in the center and its vicinity of the recording mark part in the film thickness directions, the recording layer changes to a phase that transmits more electron beams than the recording layer in an unrecorded state (that is, presents white contrast in a TEM image). A phase that contains a large amount of a light element is likely to transmit an electron beam. Accordingly, it is shown that a phase that contains large amounts of light elements is exhibited in the center and its vicinity. This phase is considered to be a Bi oxide, a boron oxide, and a Zn oxide, or a phase where the mixture ratio of these oxides has changed. Further, in FIG. 6, (c) also shows that the film thickness of the recording mark part increases in the center and its vicinity so that there is a change in the film thickness.

Further, in the planar TEM observation shown in FIG. 7, the substrate, the reflective layer, and the cover layer were removed. FIG. 7 shows that granular shapes of approximately several to 10 nm are formed in the recording marks (recording mark part) encircled with white wavy lines. Compounds containing Bi, which is a heavy element, are phase-separated into the black-contrast granular parts. The parts that are particularly black are considered to be where Bi aggregates. These are distributed in the vicinity of the interfaces of the recording layer in (b) of FIG. 6. A phase containing a large amount of a light element is separated into the white-contrast granular parts. As described above, these are distributed in the center and its vicinity of the recording layer as shown in (b) of FIG. 6. Thus, the observation result of FIG. 7 shows that a phase of Bi, which is a constituent heavy element of the recording layer, or a phase containing a large amount of Bi and a phase containing large amounts of light elements are separated from each other in the recording mark part.

As described above, structures for the WORM optical recording medium of the present invention are preferably, but not limited to, the structures (I) through (V).

Figure 8:
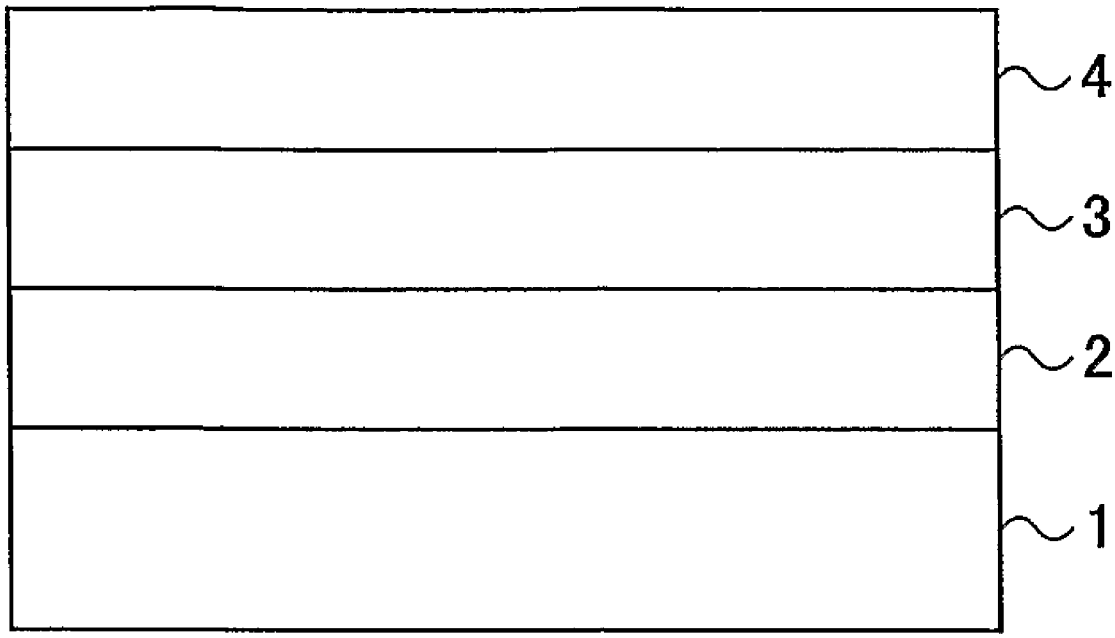
FIG. 8 is a schematic diagram showing a WORM optical recording medium having a structure (I) according to one embodiment of the present invention.
Figure 8:

FIG. 8 is a schematic diagram showing a WORM optical recording medium having the structure (I) according to one embodiment of the present invention. Referring to FIG. 8, the WORM optical recording medium includes a support substrate 1, a recording layer 2, an upper protective layer 3, and a reflective layer 4.

Figure 9:
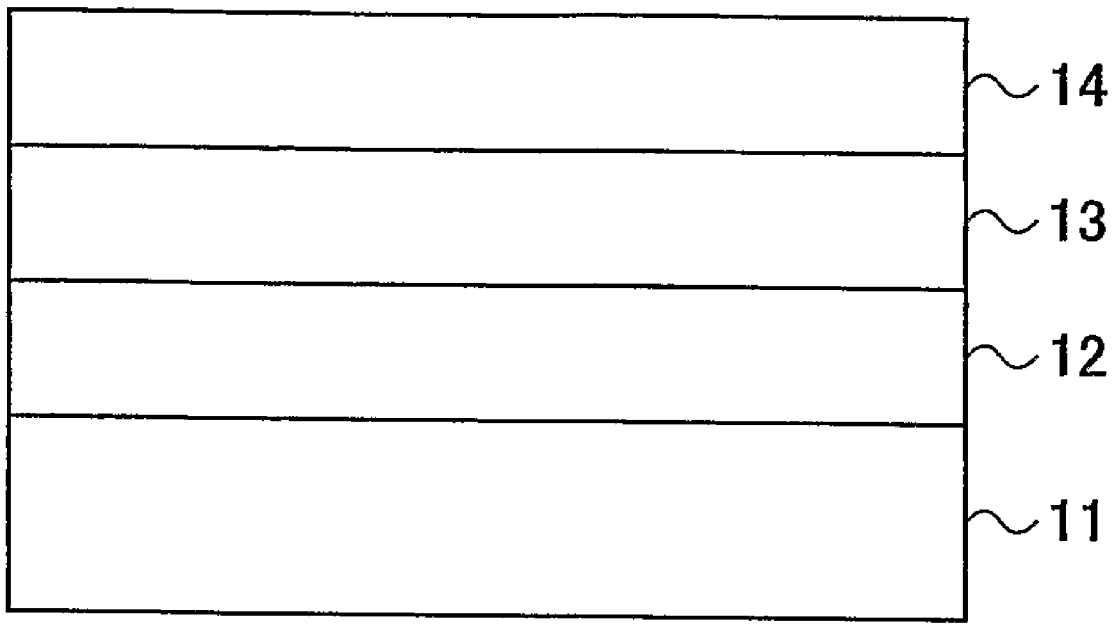
FIG. 9 is a schematic diagram showing a WORM optical recording medium having a structure (II) according to one embodiment of the present invention.
Figure 9:

FIG. 9 is a schematic diagram showing a WORM optical recording medium having the structure (II) according to one embodiment of the present invention. Referring to FIG. 9, the WORM optical recording medium includes a support substrate 11, a lower protective layer 12, a recording layer 13, and an upper protective layer 14.

Figure 10:
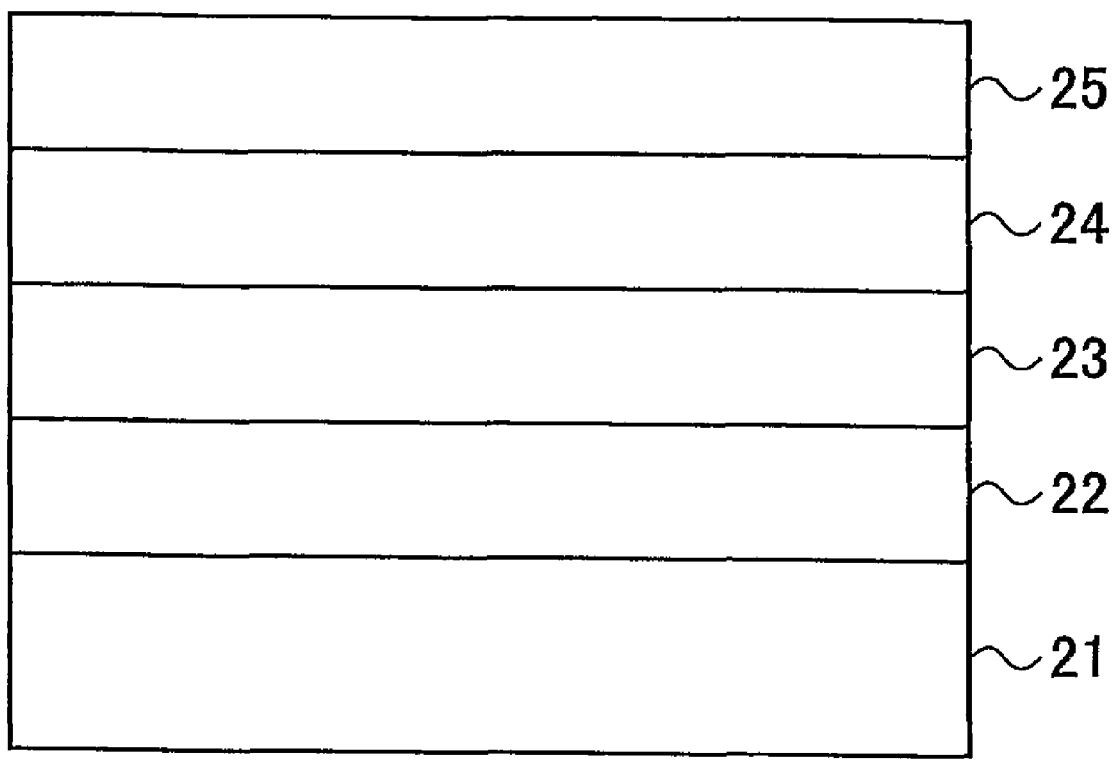
FIG. 10 is a schematic diagram showing a WORM optical recording medium having a structure (III) according to one embodiment of the present invention.
Figure 10:

FIG. 10 is a schematic diagram showing a WORM optical recording medium having the structure (III) according to one embodiment of the present invention. Referring to FIG. 10, the WORM optical recording medium includes a support substrate 21, a lower protective layer 22, a recording layer 23, an upper protective layer 24, and a reflective layer 25.

Figure 11:
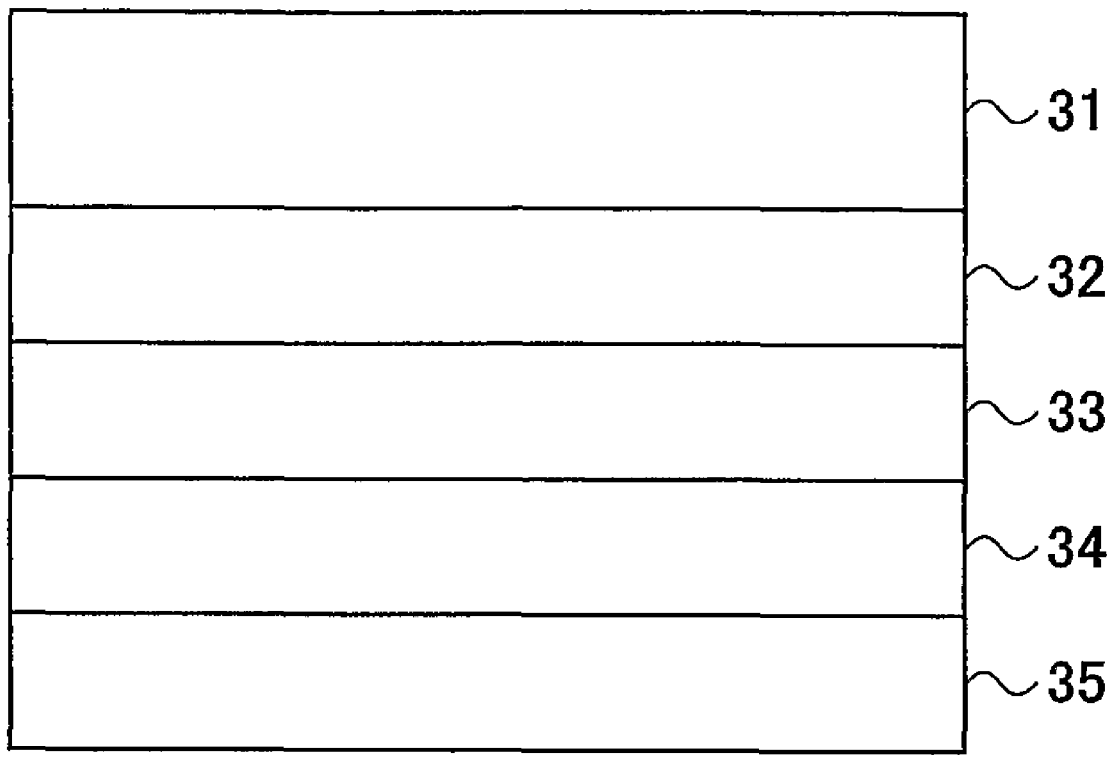
FIG. 11 is a schematic diagram showing a WORM optical recording medium having the structure (IV) according to one embodiment of the present invention.
Figure 11:

FIG. 11 is a schematic diagram showing a WORM optical recording medium having the structure (IV) according to one embodiment of the present invention. Referring to FIG. 11, the WORM optical recording medium includes a support substrate 31, an upper protective layer 32, a recording layer 33, a lower protective layer 34, and a cover layer 35.

Figure 12:
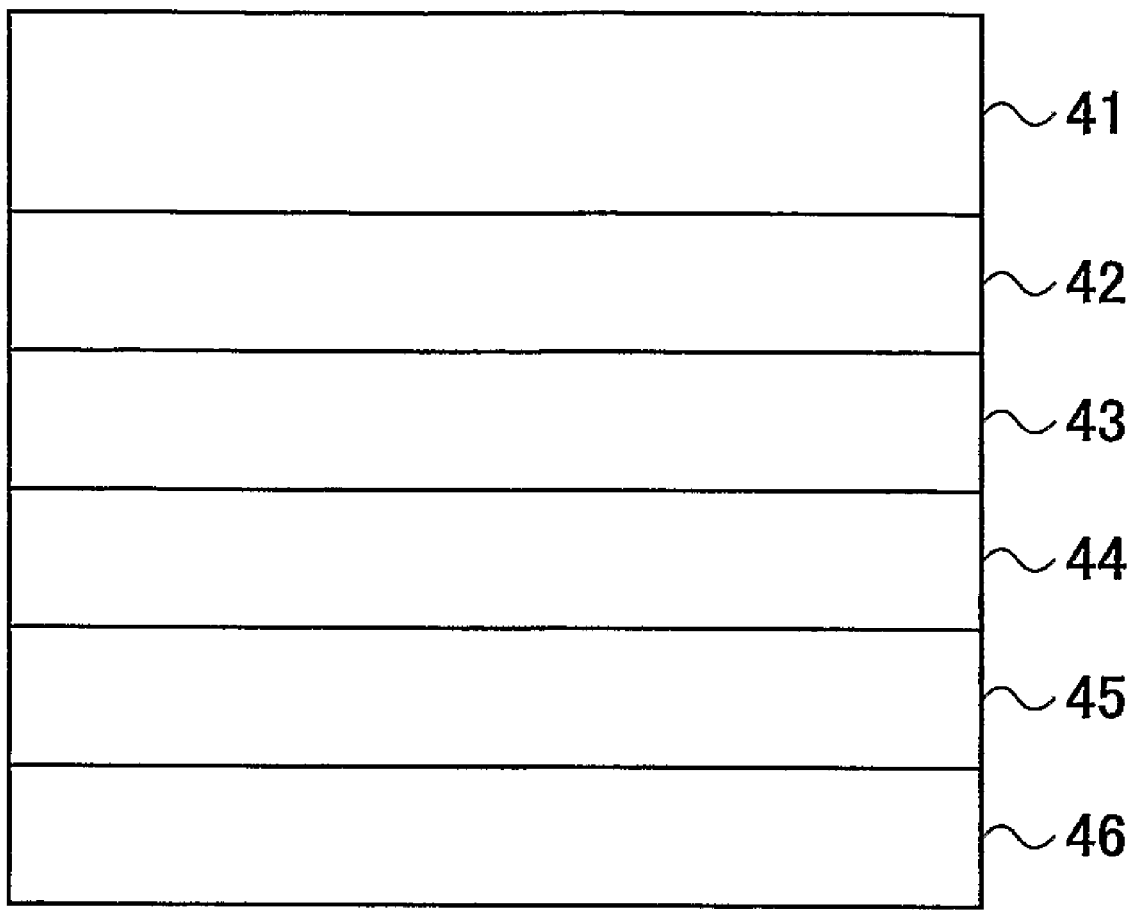
FIG. 12 is a schematic diagram showing a WORM optical recording medium having a structure (V) according to one embodiment of the present invention.

FIG. 12 is a schematic diagram showing a WORM optical recording medium having the structure (V) according to one embodiment of the present invention. Referring to FIG. 12, the WORM optical recording medium includes a support substrate 41, a reflective layer 42, an upper protective layer 43, a recording layer 44, a lower protective layer 45, and a cover layer 46.

Figure 13:
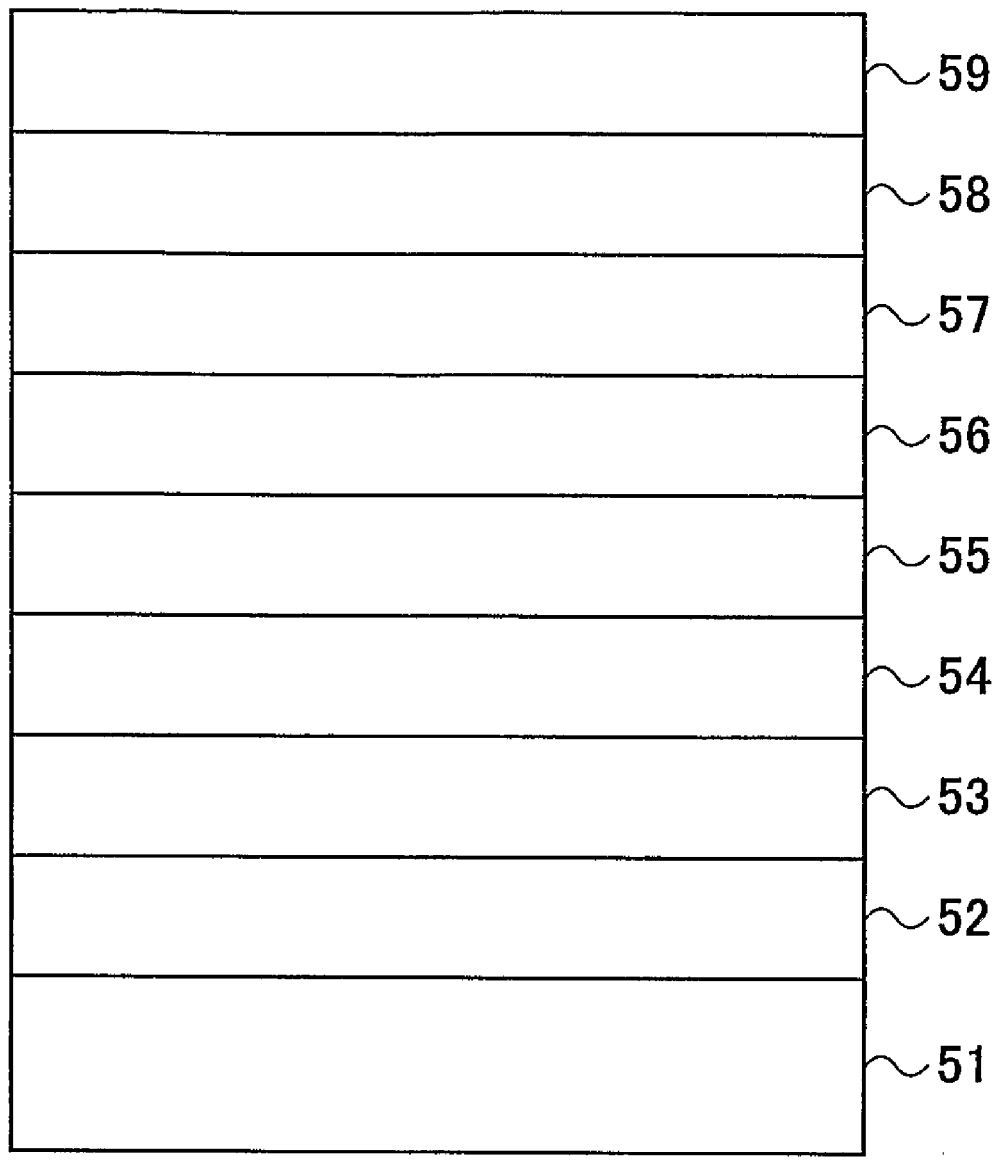
FIG. 13 is a schematic diagram showing a WORM optical recording medium having a "two-tier" structure using the structure (I) as a basis according to one embodiment of the present invention.

FIG. 13 is a schematic diagram showing a WORM optical recording medium having a "two-tier" structure using the structure (I) as a basis according to one embodiment of the present invention. Referring to FIG. 13, the WORM optical recording medium includes a substrate 51, a recording layer 52, an upper protective layer 53, a reflective layer (translucent layer) 54, a bonding layer 55, a recording layer 56, an upper protective layer 57, a reflective layer 58, and a substrate 59.

According to one aspect of the present invention, the constituent element of the specific adjacent layer that forms a specific adjacent layer element dispersion region in the recording layer is a metal or metalloid element. If the material of the specific adjacent layer contains multiple metal or metalloid elements as "constituent elements," any constituent element may be dispersed in the recording layer to form a specific adjacent layer element dispersion region. Further, the constituent element may be dispersed in the recording layer in any form. For example, the constituent element may be dispersed in the recording layer in the form of a compound as it is present in the specific adjacent layer, or the constituent element alone may be dispersed in the recording layer as a result of decomposition or reduction.

The present invention is not limited to the specifically disclosed embodiments, and variations and modifications may be made without departing from the scope of the present invention.

The present application is based on Japanese Priority Patent Applications No. 2007-096867, filed on Apr. 2, 2007 and No. 2007-135903, filed on May 22, 2007, the entire contents of which are hereby incorporated by reference.

The invention claimed is:

1. A write-once-read-many optical recording medium, comprising:
    a support substrate; and
    a recording layer and a layer adjacent to the recording layer on the support substrate, the recording layer containing an oxide of one of a metal and a metalloid as a principal component,
    wherein the recording layer includes a region where a constituent element of the adjacent layer is dispersed, and
    recording and reproduction are performable with laser light of a blue wavelength region, and
    wherein the write-once-read-many optical recording medium further comprises: an additional layer adjacent to the recording layer, wherein positions at which a number of atoms of the one of the metal and the metalloid of the oxide is a half of a maximum of the number of atoms in the recording layer in an analysis of a composition of the write-once-read-many optical recording medium in a direction of a film thickness thereof are defined as interfaces between the recording layer and the adjacent layer and the additional adjacent layer, and a ratio of the element of the adjacent layer at a center of the recording layer is more than or equal to 5 at % of elements of the recording layer, the center of the recording layer being determined by the interfaces.

2. The write-once-read-many optical recording medium as claimed in claim 1, wherein the recording and the reproduction are performed from a side of the support substrate, and the adjacent layer is provided on a side of the recording layer opposite to the side of the support substrate.

3. The write-once-read-many optical recording medium as claimed in claim 1, wherein the recording and the reproduction are performed from a side opposite to the support substrate, and the adjacent layer is provided on a side of the recording layer opposite to the support substrate.

4. The write-once-read-many optical recording medium as claimed in claim 1, wherein the adjacent layer contains one of an oxide, a nitride, a carbide, a fluoride, and a sulfide, and the constituent element of the adjacent layer dispersed in the region in the recording layer is bonded to one of oxygen, nitrogen, carbon, fluorine, and sulfur in the one of the oxide, the nitride, the carbide, the fluoride, and the sulfide.

5. The write-once-read-many optical recording medium as claimed in claim 4, wherein the adjacent layer contains ZnS as a principal component, and the constituent element of the adjacent layer dispersed in the region in the recording layer is Zn.

6. The write-once-read-many optical recording medium as claimed in claim 1, further comprising: a protective layer, wherein the recording layer, the adjacent layer, and the protective layer are successively stacked in order, and the adjacent layer contains a simple substance of at least one element M as a principal component, the at least one element M reinforcing a light absorbing function with respect to the laser light.

7. The write-once-read-many optical recording medium as claimed in claim 1, wherein the one of the metal and the metalloid is bismuth.

8. The write-once-read-many optical recording medium as claimed in claim 1, wherein a value of an imaginary part of a complex index of refraction of the recording layer is more than or equal to 0.30 and a value of a real part of the complex index of refraction of the recording layer is more than or equal to 2.20 when the recording layer is exposed to the laser light.

9. A write-once-read-many optical recording medium, comprising:
    a support substrate; and
    a recording layer and a layer adjacent to the recording layer on the support substrate, the recording layer containing an oxide of one of a metal and a metalloid and a simple substance of at least one element M as a principal component,
    wherein the recording layer includes a region where a constituent element of the adjacent layer is dispersed,
    recording and reproduction are performable with laser light of a blue wavelength region, and the at least one element M reinforces a light absorbing function with respect to the laser light, and wherein the write-once-read-many optical recording medium further comprises: an additional layer adjacent to the recording layer, wherein positions at which a number of atoms of the one of the metal and the metalloid of the oxide is a half of a maximum of the number of atoms in the recording layer in an analysis of a composition of the write-once-read-many optical recording medium in a direction of a film thickness thereof are defined as interfaces between the recording layer and the adjacent layer and the additional adjacent layer, and a ratio of the element of the adjacent layer at a center of the recording layer is more than or equal to 5 at % of elements of the recording layer, the center of the recording layer being determined by the interfaces.

10. The write-once-read-many optical recording medium as claimed in claim 9, wherein the recording and the reproduction are performed from a side of the support substrate, and the adjacent layer is provided on a side of the recording layer opposite to the side of the support substrate.

11. The write-once-read-many optical recording medium as claimed in claim 9, wherein the recording and the reproduction are performed from a side opposite to the support substrate, and the adjacent layer is provided on a side of the recording layer opposite to the support substrate.

12. The write-once-read-many optical recording medium as claimed in claim 9, wherein the adjacent layer contains one of an oxide, a nitride, a carbide, a fluoride, and a sulfide, and the constituent element of the adjacent layer dispersed in the region in the recording layer is bonded to one of oxygen, nitrogen, carbon, fluorine, and sulfur in the one of the oxide, the nitride, the carbide, the fluoride, and the sulfide.

13. The write-once-read-many optical recording medium as claimed in claim 12, wherein the adjacent layer contains ZnS as a principal component, and the constituent element of the adjacent layer dispersed in the region in the recording layer is Zn.

14. The write-once-read-many optical recording medium as claimed in claim 9, further comprising: a protective layer, wherein the recording layer, the adjacent layer, and the protective layer are successively stacked in order.

15. The write-once-read-many optical recording medium as claimed in claim 9, wherein the one of the metal and the metalloid is bismuth.

16. The write-once-read-many optical recording medium as claimed in claim 9, wherein a value of an imaginary part of a complex index of refraction of the recording layer is more than or equal to 0.30 and a value of a real part of the complex index of refraction of the recording layer is more than or equal to 2.20 when the recording layer is exposed to the laser light.

17. A write-once-read-many optical recording medium, comprising:
   a support substrate; and
   a recording layer on the support substrate,
   wherein recording and reproduction are performable with laser light of a blue wavelength region,
   the recording layer includes an M element dispersion region formed of at least one element M reinforcing a light absorbing function with respect to the laser light, the at least one element M being buried in the recording layer after formation of the recording layer, and
   the recording layer is one of
      (a) a recording layer containing an oxide of one of a metal and a metalloid as a principal component;
      (b) a recording layer containing an oxide of one of a metal and a metalloid and a simple substance of an element of the oxide which element is bonded to oxygen as a principal component;
      (c) a recording layer containing an oxide of one of a metal and a metalloid and the simple substance of the at least one element M as a principal component;
      (d) a recording layer containing an oxide of one of a metal and a metalloid, the simple substance of the at least one element M, and an oxide of the at least one element M as a principal component; and
      (e) a recording layer containing an oxide of one of a metal and a metalloid, a simple substance of an element of the oxide which element is bonded to oxygen, the simple substance of the at least one element M, and an oxide of the at least one element M as a principal component, and
   wherein a value of an imaginary part of a complex index of refraction of the recording layer is more than or equal to 0.30 and a value of a real part of the complex index of refraction of the recording layer is more than or equal to 2.20 when the recording layer is exposed to the laser light.

* * * * *